US011313878B2

(12) United States Patent
Ovchinnikova et al.

(10) Patent No.: US 11,313,878 B2
(45) Date of Patent: Apr. 26, 2022

(54) PAN-SHARPENING FOR MICROSCOPY

(71) Applicant: UT-Battelle, LLC, Oak Ridge, TN (US)

(72) Inventors: Olga S. Ovchinnikova, Oak Ridge, TN (US); Nikolay Borodinov, Oak Ridge, TN (US); Anton V. Ievlev, Oak Ridge, TN (US); Sergei V. Kalinin, Oak Ridge, TN (US); Rama K. Vasudevan, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 17/232,774

(22) Filed: Apr. 16, 2021

(65) Prior Publication Data

US 2021/0325428 A1   Oct. 21, 2021

Related U.S. Application Data

(60) Provisional application No. 63/010,967, filed on Apr. 16, 2020.

(51) Int. Cl.
| *G01Q 30/04* | (2010.01) |
| *G01Q 60/24* | (2010.01) |
| *G01N 23/22* | (2018.01) |
| *G01N 23/2258* | (2018.01) |

(52) U.S. Cl.
CPC ......... *G01Q 30/04* (2013.01); *G01N 23/2258* (2013.01); *G01Q 60/24* (2013.01)

(58) Field of Classification Search
CPC ..... G01Q 30/04; G01Q 60/24; G01N 23/2258
USPC .......................................................... 850/10
See application file for complete search history.

(56) References Cited

U.S. PATENT DOCUMENTS

| 2015/0044098 | A1* | 2/2015 | Smart | G01J 3/2823 |
| | | | | 422/82.05 |
| 2017/0119130 | A1* | 5/2017 | Witchell | A45D 44/005 |
| 2018/0184015 | A1* | 6/2018 | Richarte | H04N 5/2355 |
| 2020/0193580 | A1* | 6/2020 | McCall | H04N 5/332 |
| 2020/0193597 | A1* | 6/2020 | Fan | G16H 30/40 |

OTHER PUBLICATIONS

Cui, Z. et al., "Radiation-induced reduction—polymerization route for the synthesis of PEDOT conducting polymers", Radiat. Phys. Chem., 2016, pp. 157-166, vol. 119.

(Continued)

*Primary Examiner* — Nicole M Ippolito
(74) *Attorney, Agent, or Firm* — Scully, Scott, Murphy & Presser, P.C.

(57) ABSTRACT

Techniques for generating full-spatial resolution, full spectral resolution image(s) from a 3D spectral-data cube for any spectral value within a given spectral range are provided without requiring the acquisition of all full-spatial resolution, full spectral resolution data by an instrument. The 3D spectral-data cube is generated from a limited number of full-spatial resolution, sparse spectral resolution data and a sparse-spatial resolution, full-spectral resolution data of the same area of the sample. The use of the 3D spectral-data cube reduces the data acquisition time.

27 Claims, 10 Drawing Sheets
(10 of 10 Drawing Sheet(s) Filed in Color)

(56) References Cited

OTHER PUBLICATIONS

Floresyona, D. et al., "Highly active poly(3-hexylthiophene) nanostructures for photocatalysis under solar light", Appl. Catal. B, 2017, pp. 23-32, vol. 209.

Mikhalchan, A. et al., "Revealing Chemical Heterogeneity of CNT Fiber Nanocomposites via Nanoscale Chemical Imaging", Chem. Mater., 2018, pp. 1856-1864, vol. 30.

Clede, S. et al., "Detection of an estrogen derivative in two breast cancer cell lines using a single core multimodal probe for imaging (SCoMPI) imaged by a panel of luminescent and vibrational techniques", Analyst, 2013, pp. 5627-5638, vol. 138.

Pancani, E. et al., "High-Resolution Label-Free Detection of Biocompatible Polymeric Nanoparticles in Cells", Part. Part. Syst. Charact., 2018, pp. 1-9, vol. 35.

Gourion-Arsiquaud, S. et al., "Studying Variations in Bone Composition at Nano-Scale Resolution: A Preliminary Report", Calcif. Tissue Int., 2014, pp. 413-418, vol. 95.

Belianinov, A. et al., "Big data and deep data in scanning and electron micro-scopies: deriving functionality from multidimensional data sets", Adv. Struct. Chem. Imaging, 2015, pp. 1-25, vol. 1, No. 6.

Somnath, S. et al., "Ultrafast current imaging by Bayesian inversion", Nat. Commun., 2018, pp. 1-11, vol. 9, No. 513.

Nikiforov, M. P. et al., "Functional recognition imaging using artificial neural networks: applications to rapid cellular identification via broadband electro-mechanical response", Nanotechnology, 2009, pp. 1-8, vol. 20.

Jesse, S. et al., "Principal component and spatial correlation analysis of spectroscopic-imaging data in scanning probe microscopy", Nanotechnology, 2009, pp. 1-7, vol. 20.

Ovchinnikova, O. et al., "Co-registered topographical, band excitation nano-mechanical, and mass spectral imaging using a combined atomic force micro-scopy/mass spectrometry platform", ACS Nano, 2015, pp. 4260-4269, vol. 9, No. 4.

Dazzi, A. et al., "AFM-IR: combining atomic force microscopy and infrared spectroscopy for nanoscale chemical characterization", Appl. Spectrosc., 2012, pp. 1365-1384, vol. 66, No. 12.

Gruverman, A. et al., "Imaging and Control of Domain Structures in Ferroelectric Thin Films via Scanning Force Microscopy", Annu. Rev. Mater. Sci., 1998, pp. 101-123, vol. 28.

Thompson, G. L. et al., "Electromechanical and elastic probing of bacteria in a cell culture medium" Nanotechnology, 2012, pp. 1-10, vol. 23.

Collins, L. et al., "Breaking the time barrier in Kelvin probe force microscopy: fast free force reconstruction using the G-mode platform", ACS Nano, 2017, pp. 8717-8729, vol. 11.

Collins, L. et al., "Multifrequency spectrum analysis using fully digital G Mode-Kelvin probe force microscopy", Nanotechnology, 2016, pp. 1-9, vol. 27.

Somnath, S. et al., "Full information acquisition in piezoresponse force microscopy", Appl. Phys. Lett., 2015, pp. 263102-1 to 263102-4, vol. 107.

Dazzi, A. et al., "AFM-IR: technology and applications in nanoscale infrared spectroscopy and Chemical imaging", Chem. Rev., 2016, pp. 5146-5173, vol. 117.

Morsch, S. et al., "Insights into epoxy network nanostructural heterogeneity using AFM-IR", ACS Appl. Mater. Interfaces, 2016, pp. 959-966, vol. 8.

Van De Pals, R. et al., "Image fusion of mass spectrometry and microscopy: a multimodality paradigm for molecular tissue mapping", Nat. Methods, 2015, pp. 366-372, vol. 12, No. 4.

Tarolli, J. G. et al., "Multimodal image fusion with SIMS: preprocessing with image registration", Biointerphases, 2016, pp. 02A311-1 to 02A311-10, vol. 11, No. 2.

Sobol, O. et al., "First use of data fusion and multivariate analysis of ToF-SIMS and SEM image data for studying deuterium-assisted degradation processes in duplex steels", Surf. Interface Anal., 2016, pp. 474-478, vol. 48.

Vollnhals, F. et al., "Correlative microscopy combining secondary ion mass spectrometry and electron microscopy: comparison of intensity-hue-saturation and Laplacian pyramid methods for image fusion", Anal. Chem., 2017, pp. 10702-10710, vol. 89.

Vivone, G. et al., "A critical comparison among pansharpening algorithms", IEEE Trans. Geosci. Remote Sens., 2015, pp. 2565-2586, vol. 53, No. 5.

Belianinov, A. et al., "Correlated materials characterization via multimodal chemical and functional imaging", ACS Nano, 2018, pp. 11798-11818, vol. 12.

Ievlev, A. V. et al., "Automated interpretation and extraction of topographic Information from time of flight secondary ion mass spectrometry data", Sci. Rep., 2017, pp. 1-7, vol. 7.

Somnath, S. et al., "Improved spatial resolution for spot sampling in thermal desorption atomic force microscopy—mass spectrometry via rapid heating functions", Nanoscale, 2017, pp. 5708-5717, vol. 9.

Cosgrove, D. J., "Growth of the plant cell wall", Nat. Rev. Mol. Cell Biol., 2005, pp. 850-861, vol. 6.

Somerville, C. et al., "Toward a systems approach to understanding plant cell walls", Science, 2004, pp. 2206-2211; vol. 306.

Burton, R. A. et al., "Heterogeneity in the chemistry, structure and function of plant cell walls", Nat. Chem. Biol., 2010, pp. 724-732, vol. 6.

Cosgrove, D. J., "Nanoscale structure, mechanics and growth of epidermal cell walls", Curr. Opin. Plant Biol., 2018, pp. 77-86, vol. 46.

Gindl, W. et al., "Mechanical properties of spruce wood cell walls by nanoindentation", Appl. Phys. A, 2004, pp. 2069-2073, vol. 79.

Tetard, L. et al., "Development of new methods in scanning probe microscopy for lignocellulosic biomass characterization", Ind. Biotechnol., 2012, pp. 245-249, vol. 8.

Alonso-Simon, A. et al., "The use of FTIR spectroscopy to monitor modifications in plant cell wall architecture caused by cellulose biosynthesis inhibitors", Plant Signal Behav., 2011, pp. 1104-1110, vol. 6.

Chanliaud, E. et al., "Mechanical properties of primary plant cell wall analogues", Planta, 2002, pp. 989-996, vol. 215.

Gibson, L. J., "The hierarchical structure and mechanics of plant materials", J. R. Soc. Interface, 2012, pp. 2749-2766, vol. 9.

Purohit, H. et al., "Miscibility of Itraconazole-Hydroxypropyl Methylcellulose Blends: Insights with High Resolution Analytical Methodologies", Mol. Pharmaceutics, 2015, pp. 4542-4553, vol. 12.

Marcott, C. et al., "Nanoscale infrared (IR) spectroscopy and imaging of structural lipids in human stratum corneum using an atomic force microscope to directly detect absorbed light from a tunable IR laser source", Exp. Dermatol., 2013, pp. 419-420, vol. 22.

Policar, C. et al., "Subcellular IR Imaging of a Metal-Carboyl Moiety Using Photothermally Induced Resonance", Angew. Chem. Int. Ed., 2011, pp. 890-894, vol. 123.

Anasys Instruments Corporation, "Tapping AFM-IR: Highest performance nanoIR chemical imaging to 10nm resolution", (2016), pp. 1-2, https://www.anasysinstruments.com/wp-content/uploads/Tapping-AFM-IR.pdf.

Franchi, G. et al., "Enhanced EDX images by fusion of multimodal SEM images using pansharpening techniques", Journal of Microscopy, 2017, pp. 1-41.

Belianinov, A. et al., "Complete information acquisition in dynamic force microscopy", Nat. Commun., 2015, pp. 1-7, vol. 6.

"Image fusion and pan-sharpening: the big picture", https://www.geosage.com/highview/imagefusion.html, printed Jul. 7, 2021.

Brown, P. et al., "Durable, superoleophobic polymer-nanoparticle composite surfaces with re-entrant geometry via solvent-induced phase transformation", Sci. Rep., 2016, pp. 1-11, vol. 6.

Kochan, K. et al., "Single cell assessment of yeast metabolic engineering for enhanced lipid production using Raman and AFM-IR imaging", Biotechnol. Biofuels, 2018, pp. 1-15, vol. 11.

Kannan, R. et al., "Deep data analysis via physically constrained linear unmixing: universal framework, domain examples, and a community-wide platform", Adv. Struct. Chem. Imaging, 2018, pp. 1-20, vol. 4.

(56) References Cited

OTHER PUBLICATIONS

Kumar, A. et al., "Spatially resolved mapping of disorder type and distribution in random systems using artificial neural network recognition", Phys. Rev. B, 2011, pp. 024203-1 to 024203-12, vol. 84.

Kalinin, S. V. et al., "Imaging mechanism of piezoresponse force microscopy of ferroelectric surfaces", Phys. Rev. B, 2002, pp. 125408-1 to 125408-11, vol. 65.

Li, J. Y. et al., "Strain-based scanning probe microscopies for functional materials, biological structures, and electrochemical systems", J. Materiomics 1, 2015, pp. 3-21.

Jochi, Y. et al., "Spontaneous synthesis of a homogeneous thermoresponsive polymer network composed of polymers with a narrow molecular weight distribution", NPG Asia Mater., 2018, pp. 840-848, vol. 10.

Loncan, L. et al., "Hyperspectral Pansharpening: A Review," in IEEE Geoscience and Remote Sensing Magazine, Sep. 2015, pp. 27-46, vol. 3, No. 3.

Mauri, A.N. et al., "Mechanical and Physical Properties of Soy Protein Films with pH-Modified Microstructures", Food Science and Technology International, 2008, pp. 119-125, vol. 14, No. 2.

\* cited by examiner

PAN-SHARPENING FOR MICROSCOPY

CROSS-REFERENCE TO RELATED APPLICATIONS

This application claims the benefit of and priority to U.S. Provisional Application Ser. No. 63/010,967 filed on Apr. 16, 2020.

STATEMENT REGARDING FEDERALLY SPONSORED RESEARCH

The United States Government has rights in this invention pursuant to contract no. DE-AC05-00OR22725 between the United States Department of Energy and UT-Battelle, LLC.

FIELD OF THE DISCLOSURE

This disclosure relates to microscopy and techniques for producing a target spatial and spectral resolution image for any target spectral value within a given spectral range without having to acquire all target spatial and spectral resolution images.

BACKGROUND

Microscopy is used to acquire images of an object (sample) using various different techniques. Many of the techniques may also use spectroscopy which measures a spectra produced by the sample when one or more constituent materials in the sample interact with electromagnetic radiation. These techniques enable the acquisition of localized physical proprieties for a wide range of materials, which can be used to characterize local chemical compositions yielding unique insights into the structure-property relationship of functional materials, novel composites and biological objects.

It is desirable to have both high spatial and high spectral images. However, acquiring a spectral datasets require capturing a full spectrum at each spatial resolution. Therefore, the time required to acquire such datasets increases proportionally with the number of acquisition points, making direct acquisition of the high-spectral and spatial images difficult. In fact, depending on the technique used to acquire the images, high spatial and spectral resolution images (full spectrum) take hours or days to generate.

Potential sample drift and degradation, as well as drastically decreased throughput of such analysis, prompt a search for alternative approaches to spectral imaging which could reliably reconstruct full-resolution dataset using reduced number of acquisitions.

One known method to reconstruct a full-resolution dataset is to fuse spectral data from different channels (different spectral resolutions). This approach establishes the relationship between known signals in the images and uses it to provide context-aware interpolation for the low-resolution image. This approach can be used in the case when the functional relationship between two images (e.g. how change of one parameter is related to change of the second one) is not precisely known a priori and needs to be established during the analysis.

However, data fusion of certain data may be prone to the generation of reconstruction artifacts. For example, the image formation mechanism in secondary electron or optical image is drastically different from chemically-sensitive spectroscopical channels, so the correlation established within data fusion process implies a relationship between that two channels that are not physically linked together. As a result, this assumption may generate reconstruction artifacts leading to misrepresentation of the system. For example, sharpening algorithms combine electron microscopy (EM) and secondary ion mass-spectrometry produce results that are strongly dependent on the brightness and contrast of the EM image. In addition, correlations in this data fusion algorithm are built by individual spectral lines and do not account for the fact that intensities of the lines in spectrum are heavily constrained.

Certain known pan-sharpening (PS) algorithms have been used to process satellite images to restore color images using grayscale images and restore spectral datasets from multi-spectral maps. PS relies on the fact that there is a clear and well-defined relationship between information captured by two or more channels with different spatial resolutions. For example, a known PS algorithm combines low spatial resolution RGB maps and high-spatial resolution grayscale images.

In this case one can find a grayscale value of a pixel based on the values of individual color channels. The resulting grayscale image, however, will contain less information rendering the reverse calculation not possible as multiple color images can collide into the same grayscale map (meaning, multiple color images can generate the same grayscale image).

SUMMARY

Accordingly, disclosed is a system which may generate any full-spatial resolution, full spectral resolution image within a given spectral range without a need to acquire all of the full-spatial resolution, full spectral resolution data by an instrument. The system reduces the time to acquire the data needed to generate any full-spatial resolution, full spectral resolution image within the given spectral range.

In an aspect of the disclosure, the system may comprise an instrument and a processor. The instrument may be configured to acquire a set of two or more first-spatial resolution monochromatic images corresponding to slices of a 3D spectral-data cube. The 3D spectral-data cube has two spatial dimensions and one spectral dimension. The two spatial dimensions have the first-spatial resolution. Each point in the two spatial dimensions has an associated spectrum extending over a given spectral range. The 3D spectral-data cube may be indicative of one or more constitutive materials of a sample and their abundance on the sample's surface.

For each first-spatial resolution monochromatic image, each first-spatial resolution point has an associated spectral value at a respective color within the given spectral range. A number of images in the set, which is acquired, are less than the number of slices of the 3D spectral-data cube.

The instrument may also be configured to acquire second-spatial resolution spectral maps of the sample. The second-spatial resolution is less than the first-spatial resolution. Each second-spatial resolution point of the second-spatial resolution spectral maps has an associated spectrum extending over the given spectral range.

The processor may be configured to receive the set of two or more first-spatial resolution monochromatic images and the second-spatial resolution spectral maps of the sample and produce the 3D spectral-data cube by combining the two or more first-spatial resolution monochromatic images and the second-spatial resolution spectral maps using a particular restoration procedure.

The processor may be further configured to generate a first-spatial resolution monochromatic image for a target spectral value within the given spectral range using the 3D spectral-data cube in response to receipt of a request for the target spectral value and cause a presentation of information about the first-spatial resolution monochromatic image for the target spectral value on a display. The target spectral value is any spectral value within the given spectral range.

In an aspect of the disclosure, the monochromatic images and spectral maps may be acquired in any order by the instrument.

In an aspect of the disclosure, the second-spatial resolution spectral maps may be analyzed to determine spectra of the one or more constitutive materials of the sample and a number of the one or more constitutive materials therein. The processor may control the instrument to acquire the set of two or more first-spatial resolution monochromatic images based on the determinations. In an aspect of the disclosure, the number of first-spatial resolution monochromatic images in the set may be greater than or equal to the determined number of the one or more constitutive materials. In other aspects, the number of monochromatic images in the set may be based on a number of peaks and the intensity thereof. In some aspects, the color of each first-spatial resolution monochromatic image acquired is within a different peak in the spectra.

In an aspect of the disclosure, the instrument may be an instrument for an atomic force microscope (AFM) in IR mode.

In an aspect of the disclosure, the processor may be incorporated in the instrument.

In an aspect of the disclosure, the spectral dimension of the 3D spectral-data cube is continuous within the given spectral range.

In an aspect of the disclosure, the particular restoration procedure may be coupled non-negative matrix factorization (CNMF). The CNMF may determine a spectra for endmembers. The spectra for the endmembers represents the spectra of the one or more constitutive materials in the sample, respectively.

In an aspect of the disclosure, the information about the first-spatial resolution monochromatic image may be the first-spatial resolution monochromatic image.

Also disclosed is an apparatus that may comprise a communication interface, a user interface, a memory and a processor. The user interface may receive requests for a target spectral value within a given spectral range. The memory may store one or more computer readable modules.

The processor may execute the one or more modules. The processor may be configured to receive a set of two or more first-spatial resolution monochromatic images corresponding to slices of a 3D spectral-data cube from an instrument via the communication interface and receive second-spatial resolution spectral maps of the sample from an instrument via the communication interface. The 3D spectral-data cube has two spatial dimensions and one spectral dimension. The two spatial dimensions have the first-spatial resolution. Each point in the two spatial dimensions has an associated spectrum extending over a given spectral range. The 3D spectral-data cube may be indicative of one or more constitutive materials of a sample and their abundance on the sample's surface. For each first-spatial resolution monochromatic image, each first-spatial resolution point has an associated spectral value at a respective color within the given spectral range. A number of images in the set, which is acquired, are less than the number of slices of the 3D spectral-data cube. The second-spatial resolution is less than the first-spatial resolution. Each second-spatial resolution point of the second-spatial resolution spectral maps has an associated spectrum extending over the given spectral range.

The processor may be configured to produce the 3D spectral-data cube by combining the two or more first-spatial resolution monochromatic images and the second-spatial resolution spectral maps using a particular restoration procedure and store the 3D spectral-data cube in the memory.

In some aspects, the processor may be configured to generate a first-spatial resolution monochromatic image for a target spectral value within the given spectral range using the stored 3D spectral-data cube in response to receipt of a request for the target spectral value via the user interface and cause a presentation of information about the first-spatial resolution monochromatic image for the target spectral value on a display.

In other aspects, the processor may transmit the 3D spectral-data cube to a server.

Also disclosed is a method comprises receiving a set of two or more first-spatial resolution monochromatic images corresponding to slices of a 3D spectral-data cube from an instrument, receiving second-spatial resolution spectral maps of the sample from an instrument and producing the 3D spectral-data cube by combining the two or more first-spatial resolution monochromatic images and the second-spatial resolution spectral maps using a particular restoration procedure and storing the 3D spectral-data cube. The 3D spectral-data cube has two spatial dimensions and one spectral dimension. The two spatial dimensions have the first-spatial resolution. Each point in the two spatial dimensions has an associated spectrum extending over a given spectral range. The 3D spectral-data cube may be indicative of one or more constitutive materials of a sample and their abundance on the sample's surface. For each first-spatial resolution monochromatic image, each first-spatial resolution point has an associated spectral value at a respective color within the given spectral range. A number of images in the set, which is acquired, are less than the number of slices of the 3D spectral-data cube. The second-spatial resolution is less than the first-spatial resolution. Each second-spatial resolution point of the second-spatial resolution spectral maps has an associated spectrum extending over the given spectral range.

The method may also comprise generating a first-spatial resolution monochromatic image for a target spectral value within the given spectral range using the stored 3D spectral-data cube in response to receipt of a request for the target spectral value and causing a presentation of information about the first-spatial resolution monochromatic image for the target spectral value. The target spectral value may be any spectral value within the given spectral range.

In other aspects, the method may comprise transmitting the 3D spectral-data cube to a server.

In an aspect of the disclosure, the combining the second-spatial resolution spectral maps with the first-spatial resolution monochromatic images may comprises decomposing the second-spatial resolution spectral maps to obtain a first matrix representing spectra of the one or more constitutive materials of the sample and decomposing the set of first-spatial resolution monochromatic images to obtain a second matrix representing abundance maps of the one or more constitutive materials on the sample's surface. The 3D spectral-data cube may be produced by multiplying the first matrix and the second matrix.

In an aspect of the disclosure, the method may further comprise analyzing the second-spatial resolution spectral maps of the sample to determine spectra of the one or more constitutive materials of the sample and a number of the one or more constitutive materials therein; and controlling the instrument to acquire the set of two or more first-spatial resolution monochromatic images based on the determinations.

Also disclosed is a computer-readable recording medium having one or more modules of computer-readable instructions. The computer-readable instructions configuring a processor to receive a set of two or more first-spatial resolution monochromatic images corresponding to slices of a 3D spectral-data cube from an instrument, receive second-spatial resolution spectral maps of the sample from an instrument and produce the 3D spectral-data cube by combining the two or more first-spatial resolution monochromatic images and the second-spatial resolution spectral maps using a particular restoration procedure and store the 3D spectral-data cube. The 3D spectral-data cube has two spatial dimensions and one spectral dimension. The two spatial dimensions have the first-spatial resolution. Each point in the two spatial dimensions has an associated spectrum extending over a given spectral range. The 3D spectral-data cube may be indicative of one or more constitutive materials of a sample and their abundance on the sample's surface. For each first-spatial resolution monochromatic image, each first-spatial resolution point has an associated spectral value at a respective color within the given spectral range. A number of images in the set, which is acquired, are less than the number of slices of the 3D spectral-data cube. The second-spatial resolution is less than the first-spatial resolution. Each second-spatial resolution point of the second-spatial resolution spectral maps has an associated spectrum extending over the given spectral range.

The computer-readable instructions may further configure the processor to generate a first-spatial resolution monochromatic image for a target spectral value within the given spectral range using the stored 3D spectral-data cube in response to receipt of a request for the target spectral value and cause a presentation of information about the first-spatial resolution monochromatic image for the target spectral value. The target spectral value may be any spectral value within the given spectral range.

Also disclosed is a system which may comprise an instrument and a processor. The instrument may be configured to acquire first-spatial resolution first-spectral resolution maps corresponding to slices of a 3D spectral-data cube and acquire second-spatial resolution second spectral resolution maps of the sample. The second-spatial resolution may be less than the first-spatial resolution and the second-spectral resolution may be more than the first-spectral resolution. Each second-spatial resolution point has an associated spectrum extending over the given spectral range and first-spatial resolution point has an associated spectrum extending over the given spectral range. The 3D spectral-data cube has two spatial dimensions and one spectral dimension. The two spatial dimensions have the first-spatial resolution. Each point in the two spatial dimensions has an associated spectrum extending over a given spectral range. The 3D spectral-data cube may be indicative of one or more constitutive materials of a sample and their abundance on the sample's surface.

The processor may be configured to receive the first-spatial resolution first-spectral resolution maps and the second-spatial resolution second spectral resolution maps of the sample; and produce the 3D spectral-data cube by combining the first-spatial resolution first-spectral resolution maps and the second-spatial resolution second spectral resolution maps using a particular restoration procedure.

The processor may also be configured to generate a first-spatial resolution image for a target spectral value within the given spectral range using the 3D spectral-data cube in response to receipt of a request for the target spectral value and cause a presentation of information about the first-spatial resolution image for the target spectral value on a display. The target spectral value is any spectral value within the given spectral range.

In other aspects, of the disclosure, the processor may be configured to transmit the 3D spectral-data cube to a server.

In an aspect of the disclosure, the instrument may be an instrument for time-of-flight secondary ion mass spectrometry (ToF-SIMS) or Electron Energy Loss Spectrometry such that the spectral dimension of the 3D spectral-data cube may be a mass spectrum or an energy spectrum.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Figure 2A:
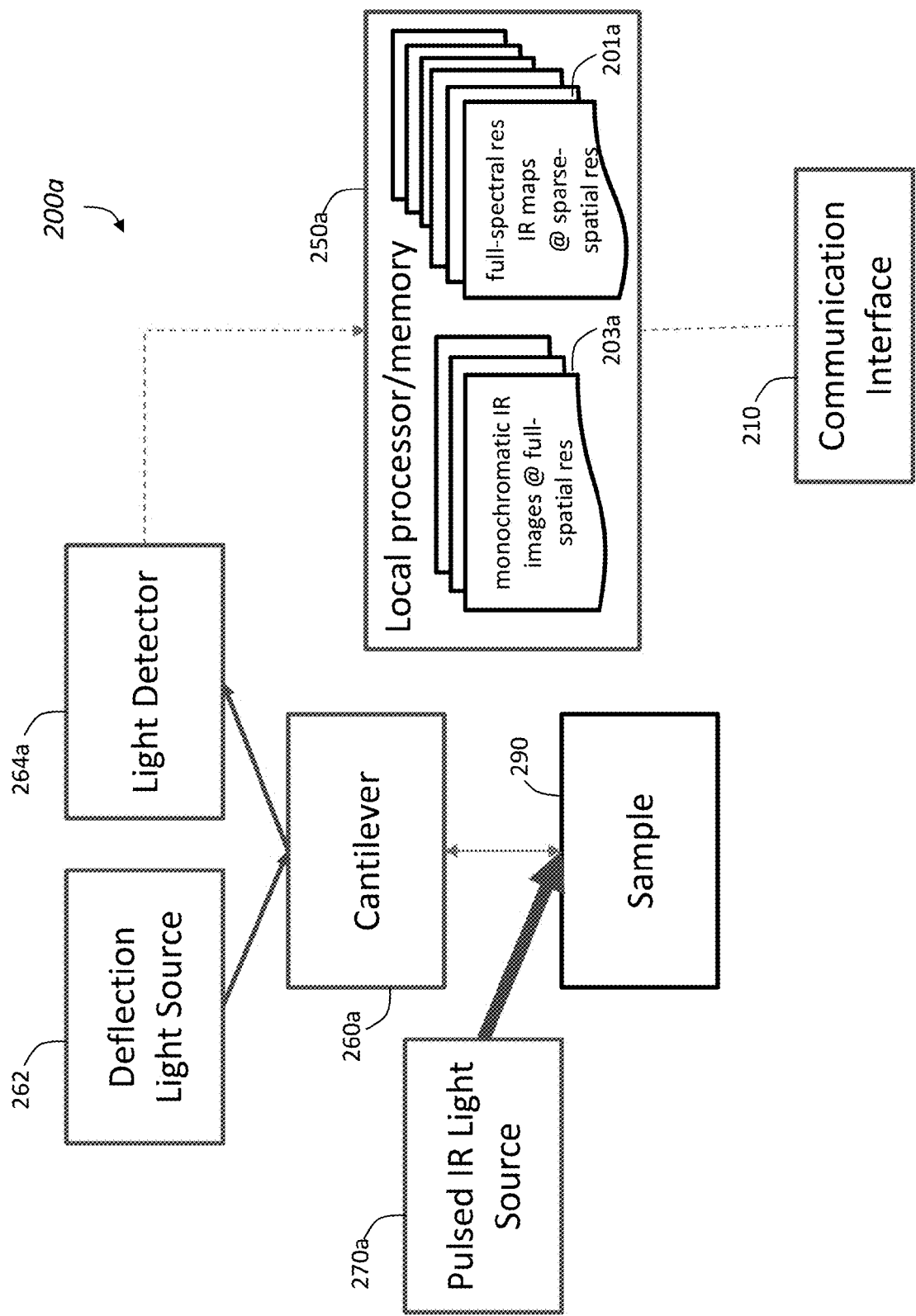
FIG. 2a is a schematic diagram of an example of an instrument for an atomic force microscopy with an IR mode in accordance with aspects of the disclosure.

Aspects of the disclosure extend certain concepts of PS to provide full-spatial resolution, full-spectral resolution data (also referred to as a 3D spectral-data cube 105 or full-resolution dataset or full-spatial resolution, full-spectral resolution map) which is generated from full-spatial resolution, sparse-spatial resolution data 103 and sparse-spatial resolution, full-spectral resolution data 101. In some aspects of the disclosure, the full-spatial resolution, sparse-spectral resolution data may be monochromatic images, such as monochromatic IR images at full-spatial resolution (as shown in FIG. 2a as "203a"). In other aspects, the full-spatial resolution, sparse-spectral resolution data may be sparse-spectral resolution maps (at a full spatial resolution). The sparse-spectral resolution maps may be mass spectrum (MS) maps (such as shown in FIG. 2b ("203b")) or Electron energy loss maps (such as shown in FIG. 2c "203c").

Figure 2B:
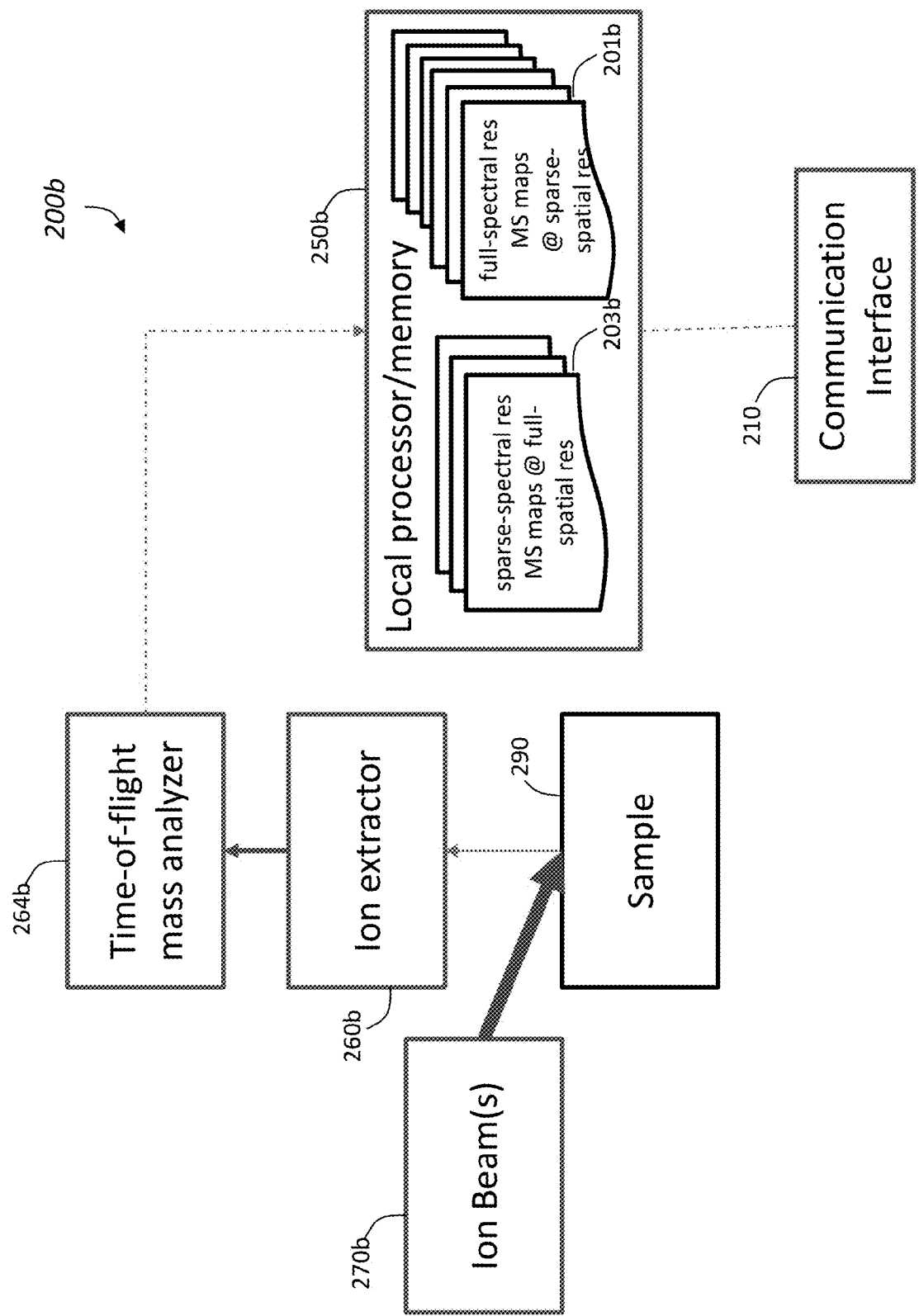
FIG. 2b is a schematic diagram of an example of an instrument for a time-of flight secondary mass spectrometry (ToF-SIMS) in accordance with aspects of the disclosure.
Figure 2C:
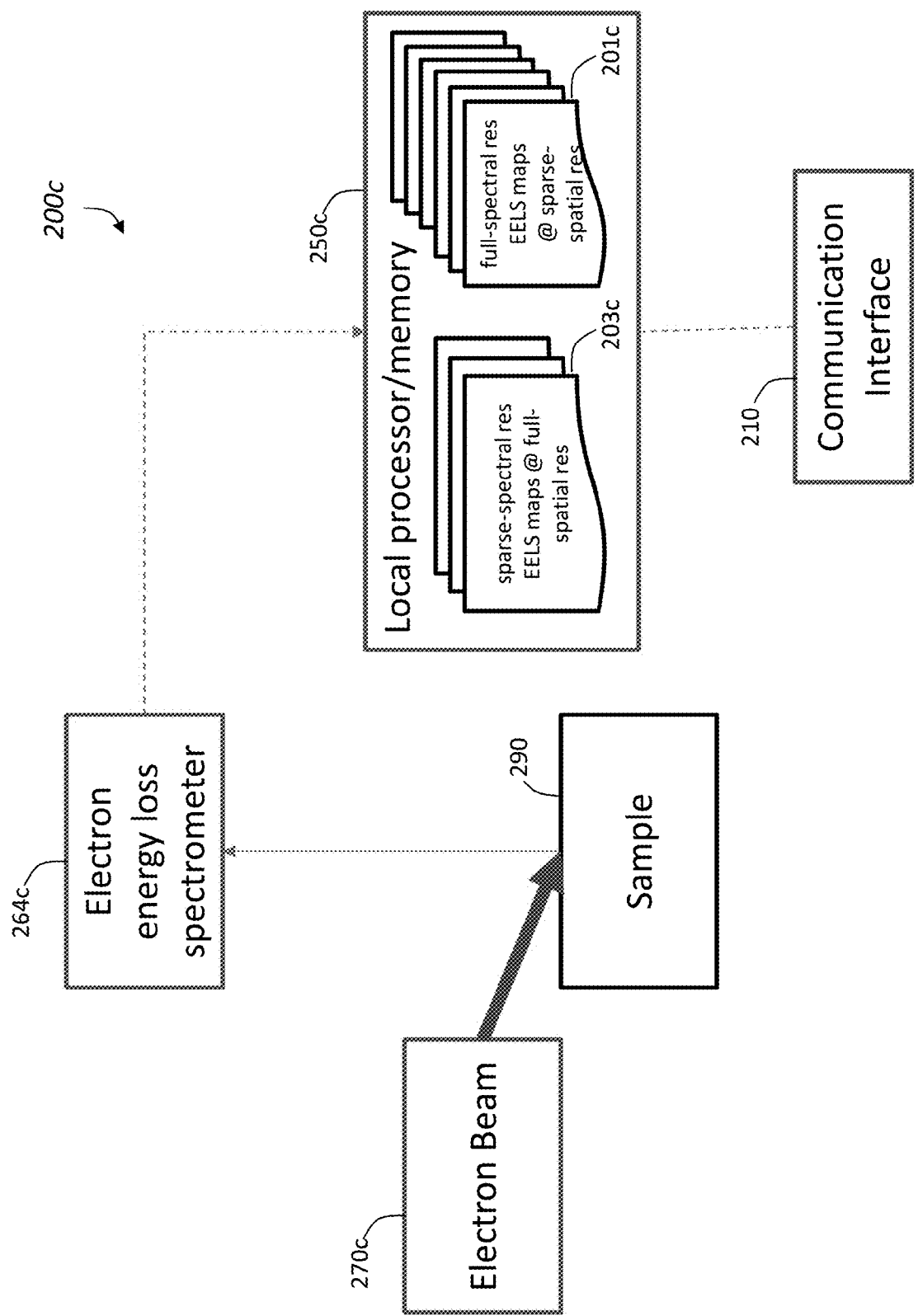
FIG. 2c is a schematic diagram of an example of an instrument for electron energy low spectroscopy (EELS) in accordance with aspects of the disclosure.

The sparse-spatial resolution, full-spectral resolution data may be maps such as full-spectral resolution IR maps (as shown in FIG. 2a as "201a"), full-spectral resolution MS maps (as shown in FIG. 2b as "201b") and full-spectral resolution EEL maps (as shown in FIG. 2c as "201c").

The 3D spectral-data cube 105 has two spatial dimensions and one spectral dimension. Each point in the two spatial dimensions has an associated spectrum extending over a given spectral range. The 3D spectral-data cube 105 can be subsequently used to generate a full-spatial resolution monochromatic data 109 (image) at any spectral value within a given spectral range. The generation of the 3D spectral-data cube 105 is different from the known PS algorithms, which only provide single-band maps (multispectral maps). Also, the 3D spectral-data cube 105 can be generated without having the instrument acquire all of the full-spatial resolution, full-spectral resolution data contained within the 3D spectral-data cube 105.

The 3D spectral-data cube 105 may be generated for a plurality of different microscopic and spectroscopic techniques, including but not limited to, atomic force microscopy within infrared spectroscopy (AFM-IR), time-of flight secondary ion mass spectrometry (ToF-SIMS), AFM mass spectrometry (AFM-MS) and Electron Energy Loss Spectrometry (EELS).

The 3D spectral-data cube 105 is particular useful in correlation between multiple modes of data acquisition such as the investigation of the interplay between chemical and physical propriety measured by different methods.

The techniques described herein use the knowledge that there is a relationship between full-spatial resolution, sparse-spectral data 103 and sparse-spatial resolution, full spectral resolution data 101 (partially overlapping data). Additionally, the techniques assume some degree of continuity is spatial data points.

Figure 1:
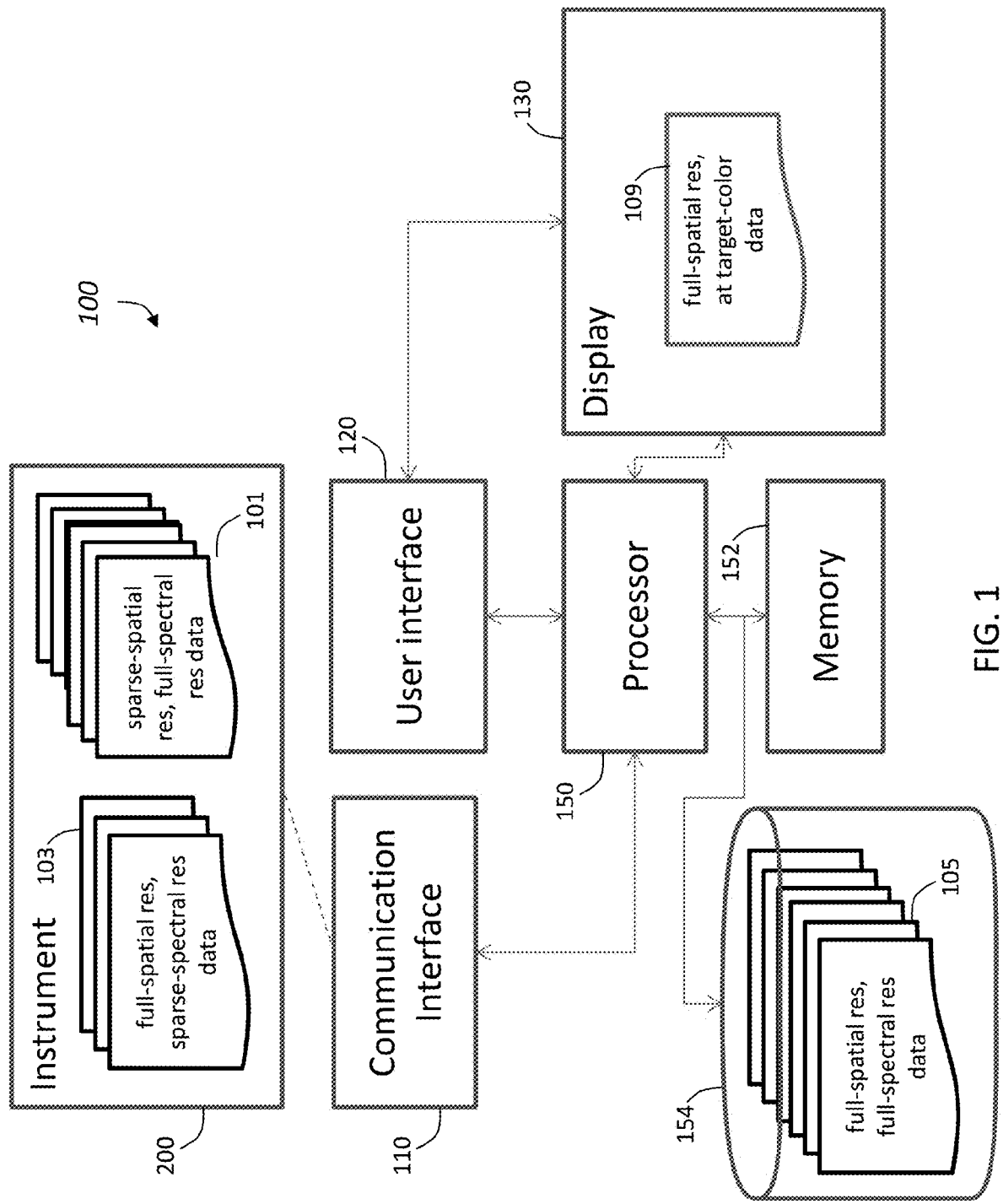
FIG. 1 is a schematic diagram of a system in accordance with aspects of the disclosure.

FIG. 1 is a schematic diagram of a system 100 in accordance with aspects of the disclosure. The system 100 includes an instrument 200. The instrument 200 may be any device(s) used for microscopy. Non-limiting examples of an instrument 200 are shown in FIGS. 2a-2c. For example, the instrument 200 may be, but not limited to, devices for atomic force microscopy (see, e.g., FIG. 2a), devices for time-offight second ion mass spectrometry (ToF-SIMS) (see, e.g., FIG. 2b) and scanning transition electron microscopy (STEM))(e.g., EELS)(see, e.g., FIG. 2c). The atomic force microscopy may have an infra-red mode (IR) or mass spectrometry mode (MS).

In accordance with aspects of the disclosure, the instrument 200 may have two channels of data acquisition. For example, one channel of acquisition may have a full-spatial resolution, sparse-spectral resolution data (103). A second channel of acquisition may be a sparse-spatial resolution, full-spectral resolution data (101). Full-spatial resolution may depend on the particular device and study and full-spectral resolution may also depend on the particular device and study.

The system 100 may also comprise a processor 150. The processor 150 may be one or more CPUs. In other aspects of the disclosure, the processor 150 may be a microcontroller or microprocessor or any other processing hardware such as an FPGA. In an aspect of the disclosure, the processor 150 may be configured to execute one or more programs stored in a memory 152 to execute the functionality described herein. The memory 152 can be, for example, RAM, persistent storage or removable storage. The memory 152 may be any piece of hardware that is capable of storing information, such as, for example without limitation, data, programs, instructions, program code, and/or other suitable information, either on a temporary basis and/or a permanent basis.

The memory 152 may also store data received from the instrument 200 (e.g., full-spatial resolution, sparse-spectral resolution data 103 and sparse-spatial resolution-full-spectral resolution data 101). The memory 152 may also store the full-spatial resolution, full-spectral resolution data 105 (3D spectral-data cube) generated by the processor 150 from the full-spatial resolution, sparse-spectral resolution data 103 and sparse-spatial resolution-full-spectral resolution data 101 received from the instrument 200. The 3D spectral-data cube 105 may be transmitted by the processor 150 to a server 154 to store the 3D spectral-data cube 105 for assess by one or more devices. A communication interface to the server 154 is not shown in FIG. 1. This communication interface may be a wired interface or a wireless interface.

The memory 152 may also provide a working storage for the processor 150 for storing data used to generate the 3D spectral-data cube such as the sparse-spatial resolution abundance maps 326, the full-spectral resolution endmember spectra 328, full-spatial resolution abundance maps 356, the sparse-spectral resolution endmember spectra 358 and any other matrices used.

The processor 150 and the instrument 200 may communicate via a communication interface 110. In an aspect of the disclosure, the communication interface 110 may be a USB interface where the instrument 200 is connected to the processor 150 using a USB cable. In other aspects of the disclosure, the communication may be wireless and the communication interface 110 may be a wireless interface such as WI-FI.

The system 100 may also comprise a display 130. The display 130 may display the data from the instrument 200 such as the full-spatial resolution, sparse-spectral resolution data 103 and sparse-spatial resolution-full-spectral resolution data 101 and/or information corresponding to the 3D spectral-data cube generated by the processor 150. The 3D spectral data cube 105 comprises a plurality of slices (each corresponding to a given spectral value). The display 130 may display any slice of the plurality of slices, upon request.

The system 100 may also comprise a user interface 120. The user interface 120 may be any type of interface to interact with the processor 150 such as a keyboard, a mouse or a touch screen superimposed on the display 130. A user may request a particular slice (target spectral value) using the user interface 120.

In an aspect of the disclosure, the processor 150, memory 152, user interface 120, display 130 and communication interface 110 may be in a desktop computer. However, in other aspects, the same may be incorporated in a portable device such as a laptop or mobile phone.

In other aspects, the user interface 120 and display 130 may be omitted and a different processor requests a server 154 for the display of a target spectral value (slice) based on a request from a user via a different user interface.

In other aspects, the processor 150, memory 152, user interface 120 and display 130 may be incorporated into the instrument 200.

FIG. 2a is a schematic diagram of an example of an instrument 200a for an atomic force microscopy with an IR mode. The instrument 200a is used to characterize a sample 290. ARM-IR provides information regarding the mechanical stiffness and dissipation (damping) at the sample surface. The instrument 200a may comprise a pulsed IR light source 270a. The light source 270a may be an oscillator. In an aspect of the disclosure, the light source 270a may be a quantum cascade laser (QCL). The oscillator may be tunable to provide a wavelength range for scanning over a given spectral range. The pulsed IR light source 270a may be configured to emit a pulsed IR light toward the sample 290. When the IR light is absorbed by the sample 290, thermal expansion occurs.

The instrument 200a may also comprise a cantilever 260a. The cantilever 260a has a tip that contacts the surface of the sample. When the sample 290 expands, the cantilever 260a vibrates (excites a contact resonance). The height of the vibration is proportional to the amount of light absorbed by the sample.

The instrument 200a may also comprise a deflection light source 262. The deflection light source 262 is configured to emit light toward the cantilever 260a.

The instrument 200a may also comprise a light detector 264a. The light detector 264a may be a photodetector such as a photodiode. The light detector 264a is configured to detect light reflected off of the cantilever 260a as it vibrates in response to the absorption at the surface of the sample 290.

The instrument 200a may also comprise a processor with memory 250a (hereinafter referred to as "processor 250a"). The processor 250a may be a CPU (similar to described above). The processor 250a may be a microcontroller or microprocessor or any other processing hardware such as an FPGA. In an aspect of the disclosure, the processor 250a may be configured to execute one or more programs stored in a memory to generate the data described herein from detection results. The memory can be RAM, persistent storage or removable storage. The memory may be any piece of hardware that is capable of storing information, such as, for example without limitation, data, programs, instructions, program code, and/or other suitable information, either on a temporary basis and/or a permanent basis. The processor 250a may be connected to the light detector 264a. In an aspect of the disclosure, depending on the processor 250a, an analog to digital converter (ADC) may be placed between the light detector 264a and the processor 250a. Relay optics are not depicted in FIG. 2a.

The sample 290 may be located on a moveable stage such that the pulsed IR light source (and cantilever) may be raster scanned across the sample 290 (in two-dimensions) The moveable stage may be controlled by the processor 250a via a motor (such as a stepper motor). The moveable stage may have multiple different resolutions of movement. For example, the movement may have a full-resolution mode which is based on the resolution of the AFM-IR and a sparse-spatial resolution mode. The sparse-spatial resolution may be determined based on desired imaging time and the processing capability of the processor 150. For example, if the full-spatial resolution is 256×256. The sparse-spatial resolution may be downsampled by at least 4 times. In other aspects, the downsample rate may be at least 8 times. In other aspects, the downsample rate may be at least 16 times. For example, the sparse-spatial resolution may be 16×16 (compared with a full-spatial resolution of 256×256).

Further a pixel size may also depend on a mode of operation for the AFM-IR. For example, AFM-IR facilitates nanometer resolution (down to 50 nm for contact mode and to 10 nm for tapping mode) for morphological, chemical, and mechanical analysis.

Thus, the processor 250a may control the moveable stage to move a greater distance between acquisition points for the sparse-spatial resolution than between acquisition points for a full-spatial resolution.

In other aspects, instead of the sample 290 being on a moveable stage, the pulsed IR light and cantilever/defection light may be moved. In this aspect, moveable mirrors may be controlled by the processor 250a to enable the scan in the two-dimensions.

Figure 7:
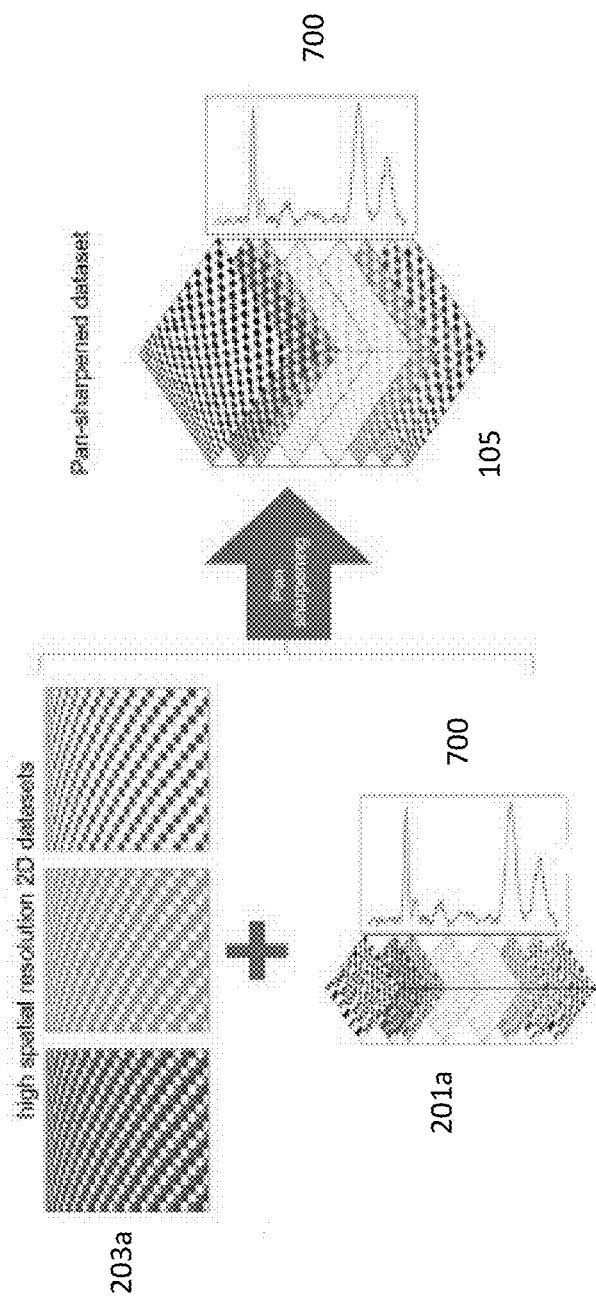
FIG. 7 illustrates examples of full-spatial resolution, sparse spectral images, a full-spectral resolution, sparse spatial maps and a 3D spectral cube in accordance with aspects of the disclosure.

To generate a full-spectral resolution IR maps (at a sparse-spatial resolution) 201a, the processor 250a may control the moveable stage (or mirrors and cantilever) to be positioned at a first spatial point at the sample (x-y point). The processor 250a may then control the pulsed IR light source 270a is began a scan at the first spatial point, e.g., starting from a minimum wavelength (or wavenumber) and subsequently moving upward in wavelength (or wavenumber) at a preset step size to a maximum wavelength (or wavenumber). Here, the wavelengths extend over a spectral range $\{\lambda_{min}, \lambda_{max}\}$ and adjacent wavelengths are separated from each other by a wavelength increment $\delta\lambda$. At each wavelength (wavenumber), the processor 250a receives from the light detector 264a a corresponding spectral intensity and stores the same. Once at the maximum wavelength (wavenumber), the processor 250a causes the moveable stage (or light and cantilever) to move to the next spatial point at the sample (for the sparse-spatial resolution). The process is repeated for each spatial point for the sparse-spatial resolution. For example, if the resolution is 16×16, the process is repeated 256 times. FIG. 7 illustrates an example of the full-spectral resolution IR maps 201a.

To generate a full-spatial resolution image (monochromatic IR image) 203a, the processor 250a may control the moveable stage (or mirrors and cantilever) to be positioned at a first spatial point at the sample (x-y point). The processor 250 may then control the pulsed IR light source 270a to emit a pulse a particular wavelength (wavenumber). The processor 250 receives from the light detector 264a a corresponding spectral intensity and stores the same. The processor 250 may control the moveable stage (or mirrors and cantilever) to be positioned at another spatial point at the sample (x-y point) (high spatial resolution). Here, the movement may be a fraction of the movement for the sparse-spatial resolution. The processor 250a may then control the pulsed IR light source 270a to emit a pulse the particular wavelength (wavenumber). The processor 250a receives from the light detector 264a a corresponding spectral intensity and stores the same. This process is repeated for each spatial point at the sample for the full-spatial resolution. Once the last spatial point is pulsed, the process may be repeated for another particular wavelength (wavenumber). The particular wavelength (wavelength) and number of wavelengths may be determined by processor 150 to generate another monochromatic IR image. FIG. 7 shows an example of a set of three monochromatic IR images 203a.

In an aspect of the disclosure, the full-spectral resolution IR maps (at a sparse-spatial resolution) 201a may be acquire first and used to determine the number of wavelengths (wavenumbers) to acquire for the monochromatic IR image(s) (and which ones) 203a. In other aspects of the disclosure, the order may be reversed and the monochromatic IR images 203a may be acquired first.

The processor 250 may transmit the full-spectral resolution IR maps (at a sparse-spatial resolution) 201a and monochromatic IR images 203a to the processor 150 via the communication interface 210. The communication interface 210 may be a USB interface (port).

FIG. 2b is a schematic diagram of an example of an instrument 200b for a time-of flight secondary mass spectrometry (ToF-SIMS).

Time-of-flight secondary ion mass spectrometry (ToF-SIMS) is characterization method allowing local studies of the chemical composition on the surface of wide range of materials and systems. It operates in vacuum such as $10^{-6}$-$10^{-10}$ mbar. It utilizes ion beam focused on the surface of studied sample 290, which leads to extraction of secondary analyte ions, which are further analyzed using time-of-flight mass analyzer 264b.

The instrument 200b may comprise one or more ion beams 270b. The one or more ion beams may be generated by an ion gun. The ion gun may be a Ga, Au or Bi gun. In an aspect of the disclosure, different beams may be generated (one focused via optics and another unfocused) to provide different spatial resolution.

The instrument 200b may also comprise an ion extractor 260b. The ion extractor 260b may comprise an electrode.

The time-of-flight mass analyzer 264b may comprise a detector to count ions and determine the time of arrival at the detector. The analyzer secondary analyte ions are accelerated in an external electric field and fly towards detector. Using time-of-flight of each detected ion, corresponding mass-to-charge ratio(s) can be calculated by a local processor with a memory 250b in the instrument 200b, this provides full mass spectrum in every irradiated point.

The processor 250b can scan the one or more ion beams across the sample the sample surface allows to plot maps of chemical composition. The processor 250b may be similar to described above.

The instrument 200b may have two modes of operation, full-spectral resolution (sparse-spatial resolution) and sparse-spectral resolution (full spatial). In a full spectral resolution mode, one of the ion beams may be intentionally unfocused. For example, the spot size of the beam may be about 5 μm. This enables a relative short pulse of irradiating ions beam. For example, the pulse width may be 5 to 10 ns. Operation in this mode allows reaching a mass resolution m/Δm up to 10,000-15,000, where m is peak's mass-to-charge ratio, and Δm is peak's FWHM. But to due to the large spot size, the spatial resolution is sparse (low). The spatial resolution is limited by the spot size.

In a sparse-spectral resolution (full spatial resolution), another of the ion beans is focused by one or more optics. The beam may be focused to about 70 to 100 nm. However, this limits the amount of material(s), which may be extracted from the sample 290. To increase the amount, the ion beam pulse width is increased. For example, the pulse width may be 100-200 ns. This leads to significant reduced mass resolution (m/Δm=100-500) but allows to perform imaging with sub-micrometer to nanometer spatial resolution.

Similar to above, the sample may be on a moveable stage to move the sample to generate a raster scan. The moveable stage may be controlled by the processor 250b. In the high spectral resolution (sparse spatial) mode, the moveable stage may be moved between points based on the spot size, e.g., about 5 μm. In the sparse spectral resolution (full spatial resolution), the processor 250b may move the moveable stage between points also based on spot size, e.g. 70 nm to 100 nm.

In other aspects, instead of a moveable stage, the raster scan may be achieved by using a moveable beams (source or mirrors) under the control of the processor 250b. The sample area may be imaged using both modes.

To generate full-spectral resolution mass spectral maps (at a sparse-spatial resolution) 201b, the processor 250b may control the moveable stage (or mirrors and source) to be positioned at a first spatial point at the sample (x-y point). The processor 250b may then control the ion gun corresponding to the unfocused beam to emit a primary ion dose. The processor 250b receives the counts and times from the time-of-flight mass analyzer 264n and stores the same. The processor 250b calculates the charge ratio.

Once calculated (or at the same time), the processor 250b causes the moveable stage (or mirror or source) to move to the next spatial point at the sample (for the sparse-spatial resolution). The process is repeated for each spatial point for the sparse-spatial resolution. For example, if the resolution is 16×16, the process is repeated 256 times (with the distance between is point being based on the spot size).

To generate full-spatial resolution mass spectral maps 203b, the processor 250b may control the moveable stage (or mirrors and source) to be positioned at a first spatial point at the sample (x-y point). The processor 250b may then control the ion gun corresponding to the focused beam to emit a primary ion dose. The processor 250b receives the counts and times from the time-of-flight mass analyzer 264n and stores the same. The processor 250b calculates the charge ratio.

Each spatial point has a corresponding mass spectrum (intensity v. mass-to-charge ratio or intensity v. mass). Intensity may be defines as the count(s).

The optics are not shown in FIG. 2b.

FIG. 2c is a schematic diagram of an example of an instrument 200c for electron energy low spectroscopy (EELS).

Electron energy loss spectroscopy (EELS) is a mode of scanning transition electron microscopy (STEM), which allows elemental analysis of the studied sample 290 with nanometer down to atomic spatial resolution. In this mode surface of the studied sample 290 is irradiated by electron beam 270c, which leads to interaction of the irradiating electrons with sample species. Backscattered electrons are further analyzed using electron spectrometer in terms of energy loss 264c. This allows plotting electron energy loss spectra (number of detected electrons vs energy loss). Collected EELS spectra contain information about local elemental composition of the studied sample.

FIG. 2c does not show optics.

The processor 250b may control the raster scan in a similar manner as described above.

Signal-to-noise ratio of the collected EELS spectra is directly proportional to collection time; therefore acquisition of the high-quality (low noise) data in most cases takes significant time. In this case EELS imaging over map may become unfeasible due to electron irradiation instabilities and local defects introduced into the studied sample by high energy electron irradiation.

To generate full-spectral resolution EELS maps (at a sparse-spatial resolution) 201c, the processor 250c may control the moveable stage (or mirrors and source) to be positioned at a first spatial point at the sample (x-y point). The processor 250b may then control the electron beam emit electron for a first time period. This time period may be a relatively long time period, which provides signal-to-noise ratio well above 1 (usually 3-10). The processor 250b receives the counts and energy loss from the EEL spectrometer 264c and stores the same.

The processor 250c causes the moveable stage (or mirror or source) to move to the next spatial point at the sample (for the sparse-spatial resolution). The process is repeated for each spatial point for the sparse-spatial resolution using the electron beam for the same time period for each acquisition point. For example, if the resolution is 16×16, the process is repeated 256 times.

To generate full-spatial resolution EELS maps (at sparse-spectral resolution) 203b, the processor 250c may control the moveable stage (or mirrors and source) to be positioned at a first spatial point at the sample (x-y point). The processor 250c may then control the electron beam 270c to emit electrons for a second time period. The second time period may be significantly shorter than the first time period, which provides low values of signal-to-noise (usually <1). The processor 250c receives the counts and energy loss from the EEL spectrometer 264c and stores the same.

Each spatial point has a corresponding energy loss spectrum (intensity v. energy loss). Intensity may be defined as the count(s).

Figure 3:
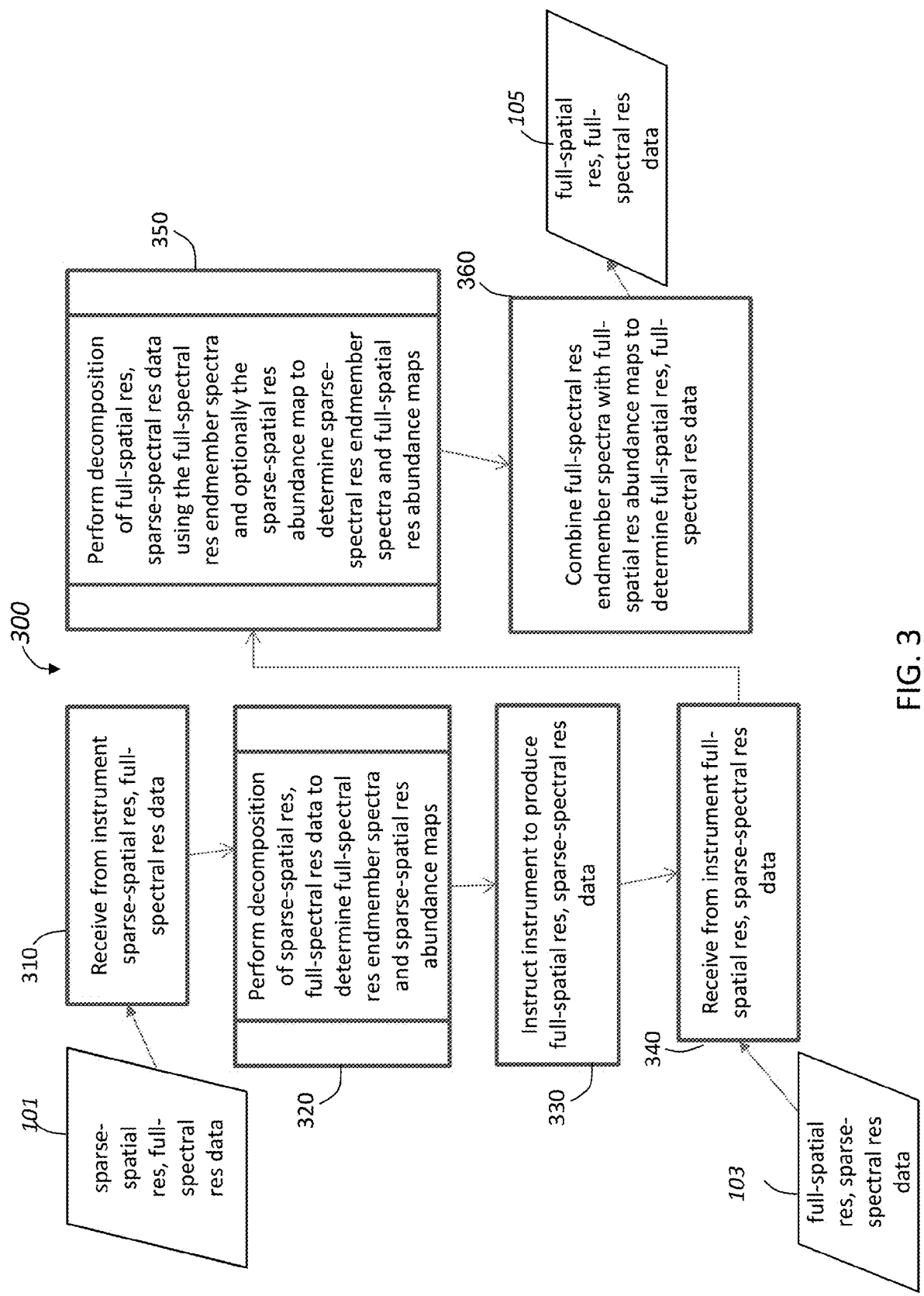
FIG. 3 illustrates a flow chart for generating a 3D spectral-data cube in accordance with aspects of the disclosure.

FIG. 3 illustrates a flow chart for generating a 3D spectral-data cube 105 in accordance with aspects of the disclosure (300) using pan sharpening. At 310, sparse-spatial resolution, full-spectral resolution data 101 is received, e.g., from an instrument 200 by the processor 150. Data 101 is defined as $N_1$ spectra corresponding to $N_1$ sparse-spatial resolution grid points, where each spectrum is a full-spectral resolution spectrum that includes $M_1$ pairs of spectral values with a given spectrum and corresponding spectral intensities. Here, the spectral values extend over a spectral range $\{\lambda_{min}, \lambda_{max}\}$ and adjacent values are separated from each other by an increment $\delta\lambda$. Data 101 can be expressed as matrix $Y_{M_1 \times N_1}$ that has $M_1$ rows and $N_1$ columns. Column j of matrix $Y_{M_1 \times N_1}$ corresponds to a respective full-spectral resolution spectrum $\sigma_j (M_1)$ associated with grid point j.

For example, for AFM-IR, each spectrum is a full-spectral resolution spectrum that includes $M_1$ pairs of wavelengths and corresponding spectral intensities. Here, the wavelengths extend over a spectral range $\{\lambda_{min}, \lambda_{max}\}$ and adjacent wavelengths are separated from each other by a wavelength increment $\delta\lambda$. FIG. 7 shows the $N_1$ grid points and $N_1$ spectra. An example of the spectra for a grid point is also shown as 700.

For MS, each spectrum is a full-spectral resolution spectrum that includes $M_1$ pairs of mass-to-charge ratios (or mass) and corresponding spectral intensity (such as counts). Here the mass-to-charge ratios (or mass) extend over a spectral range $(m/z_{min}, m/z_{max})$ (or mass) and adjacent mass-to-charge ratios are separated from each other by mass-to-charge ratio increments $\delta m/z$ (or mass).

For EELS, each spectrum is a full-spectral resolution spectrum that includes $M_1$ pairs of electron energy loss and corresponding spectral intensity (such as counts). Here the mass-to-electron energy loss extends over a spectral range $(E_{min}, E_{max})$ (or mass) and adjacent mass-to-charge ratios are separated from each other by mass-to-charge ratio increments $\delta E$.

The 3D spectral cube may be obtained from the sparse-spatial resolution, full-spectral-resolution data 101 and full-spatial resolution, sparse-spectral resolution data 103 using a coupled non-negative matrix factorization (CNMF). CNMF has two decompositions (320 and 350).

At 320, the processor 150 performs a spectral decomposition of the sparse-spatial resolution, full-spectral-resolution data 101. Here, each spectrum $\sigma_j (M_1)$ of data 101 is decomposed in terms of K endmembers as shown in EQ. (1), $$\sigma_j(M_1) = \sum_{i=1}^{K} \varepsilon_i(M_1) u_{i,j} + o_j. \qquad (1)$$

Where $\varepsilon_i (M_1)$ is a full-spectral resolution spectrum of the $i^{th}$ endmember. The endmember has unique spectral characteristics. In accordance with aspects of the disclosure, the spectra of endmembers correspond to spectra of one or more constitutive materials of a sample, respectively. In EQ. (1), coefficient $u_{i,j}$ is representative of the abundance at grid point j of a constitutive material corresponding to the $i^{th}$ endmember and term $o_j$ represents noise at grid point j. In this manner, matrix $Y_{M_1 \times N_1}$ associated with sparse-spatial resolution, full-spectral-resolution data 101 can be decomposed as a product of matrices as shown in EQ. (2), $$Y_{M_1 \times N_1} = H_{M_1 \times K} U_{K \times N_1} \qquad (2).$$

Here, matrix $H_{M_1 \times K}$ is referred to as a full-spectral resolution endmember matrix, and its column j corresponds to the respective full-spectral resolution spectrum $\varepsilon_j (M_1)$ of the $j^{th}$ endmember. Matrix $U_{K \times N_1}$ is referred to as a sparse-spatial resolution abundance map matrix, and its column j corresponds to abundances $u_{1,j}, \ldots, u_{K,j}$ at grid point j of the endmembers 1 ... K, respectively. The full-spectral resolution spectra $\varepsilon_1(M_1), \ldots, \varepsilon_K (M_1)$ and the corresponding sparse-spatial resolution abundance map can be determined based on a process 320 described in detail below in connection with FIG. 4.

At 330, the processor 150 may analyze the full-spectral resolution spectra $\varepsilon_1 (M_1), \ldots, \varepsilon_K(M_1)$ (for the endmember) to identify particular spectral features thereof. For example, in the decomposition process 320, the processor 150 determines the spectra for each endmember. The spectra may contain a plurality of peaks. The processor 150 may examine the plurality of peaks of the endmember(s) to determine a number of relevant peaks. Relevant peaks may be determined as a percentage greater than a defined intensity. In other aspects of the disclosure, the processor 150 may identify K highest peaks (where K is the number of endmembers).

The processor 150 may identify the specific spectral values associated with the identified peaks. Based on the identified number of relevant peaks (or highest peaks) and the specific spectral values, the processor 150 may instruct the instrument 200 to acquire certain full-spatial resolution, sparse spectral resolution data.

In some aspects of the disclosure, when the instrument 200 may be an AFM instrument such as shown in FIG. 2a, the processor 150 may instruct the instrument to acquire monochromatic images for two or more spectral values. In some aspects of the disclosure, the number of full-spatial resolution, sparse spectral resolution monochromatic images may be equal to or greater than a number of endmembers. In other aspects of the disclosure, the number of full-spatial resolution, sparse spectral resolution monochromatic images may be equal to or more than a number of peaks having an intensity greater than a threshold. In other aspects of the disclosure, the number of full-spatial resolution, sparse spectral resolution monochromatic images may be equal to or more than half of the determined relevant peaks. Additionally, in some aspects of the disclosure, the specific spectral value for the full-spatial image may be within a peak which is identified above. Based on the analysis, the processor 150 may transmit an instruction to the processor 250a (in the instrument) via the respective communication interface to acquire full-spatial resolution, sparse spectral resolution monochromatic image(s) for the specific spectral values.

At 340, the processor 150 may receive the full-spatial resolution, sparse-spectral resolution data 103, e.g., from instrument 200. In some aspects, the data may correspond to the requested images.

Data 103 is/are defined as $N_2$ spectra corresponding to $N_2$ full-spatial resolution grid points, where each spectrum is a sparse-spectral resolution spectrum that includes $M_2$ pairs of spectral values and corresponding spectral intensities. Here, the full-versus sparse-spatial resolution is defined as $N_2 \gg N_1$, and the sparse-versus full-spectral resolution is defined as $M_2 \ll M_1$.

In some aspects of the disclosure, instrument 200 (such as instrument 200a) is configured to produce image(s) 103 as a set of $M_2$ full-spatial resolution monochromatic images formed at respective spectral values $\lambda_1, \ldots, \lambda_{M_2}$ within the spectral range $\{\lambda_{min}, \lambda_{max}\}$.

In other aspects, the instrument 200 (such as instrument 200b/c) may produce sparse-spectral resolution maps (such as MS maps 203b or EELs maps 203c).

Data 103 can be expressed as matrix $Y_{M_2 \times N_2}$ that has $M_2$ rows and $N_2$ columns. Column j of matrix $Y_{M_2 \times N_2}$ corresponds to a respective sparse-spectral resolution spectrum $s_j$ ($M_2$) associated with grid point j.

At 350, a spectral decomposition of the full-spatial resolution, sparse-spectral resolution data 103 received by the processor 150 is performed. Here, each spectrum $s_j$ ($M_2$) of data 103 is decomposed in terms of K endmembers as shown in EQ. (3), $$s_j(M_2) = \sum_{i=1}^{K} e_i(M_2) w_{i,j} + O_j. \qquad (3)$$

Where $e_i(M_2)$ is a sparse-spectral resolution spectrum of the $i^{th}$ endmember. In an aspect of the disclosure, there is a one-to-one correspondence between the sparse- and full-spectral resolution spectra of the endmembers. For instance, in some implementations, the sparse-spectral resolution spectrum $e_j$ ($M_2$) can be a down-sampled copy of the full-spectral resolution spectrum $\varepsilon_i(M_1)$. In EQ. (3), coefficient $w_{i,j}$ is representative of the abundance at grid point j of a constitutive material corresponding to the $i^{th}$ endmember, and term $O_j$ represents noise at grid point j. In this manner, matrix $Y_{M_2 \times N_2}$ associated with high-spatial resolution, sparse-spectral resolution data 103 can be decomposed as a product of matrices as shown in EQ. (4), $$Y_{M_2 \times N_2} = H_{M_2 \times K} U_{K \times N_2} \qquad (4).$$

Here, matrix $H_{M_2 \times K}$ is referred to as a sparse-spectral resolution endmember matrix, and its column j corresponds to the respective sparse-spectral resolution spectrum $s_j$ ($M_2$) of the $j^{th}$ endmember. Matrix $U_{K \times N_2}$ is referred to as a full-spatial resolution abundance map matrix, and its column j corresponds to abundances $w_{1,j}, \ldots, w_{K,j}$ at grid point j of the endmembers 1 . . . K, respectively. Also note that abundances $w_{i,k}$ at grid points k of the full-spatial resolution grid that are common with grid points k of the sparse-spatial resolution grids are correspondingly related to abundances $u_{i,k}$. The sparse-spectral resolution spectra $e_1(M_2), \ldots, e_K(M_2)$ and the corresponding full-spatial resolution abundance maps can be determined based on process 350 described in detail below in connection with FIG. 5.

Figure 8:
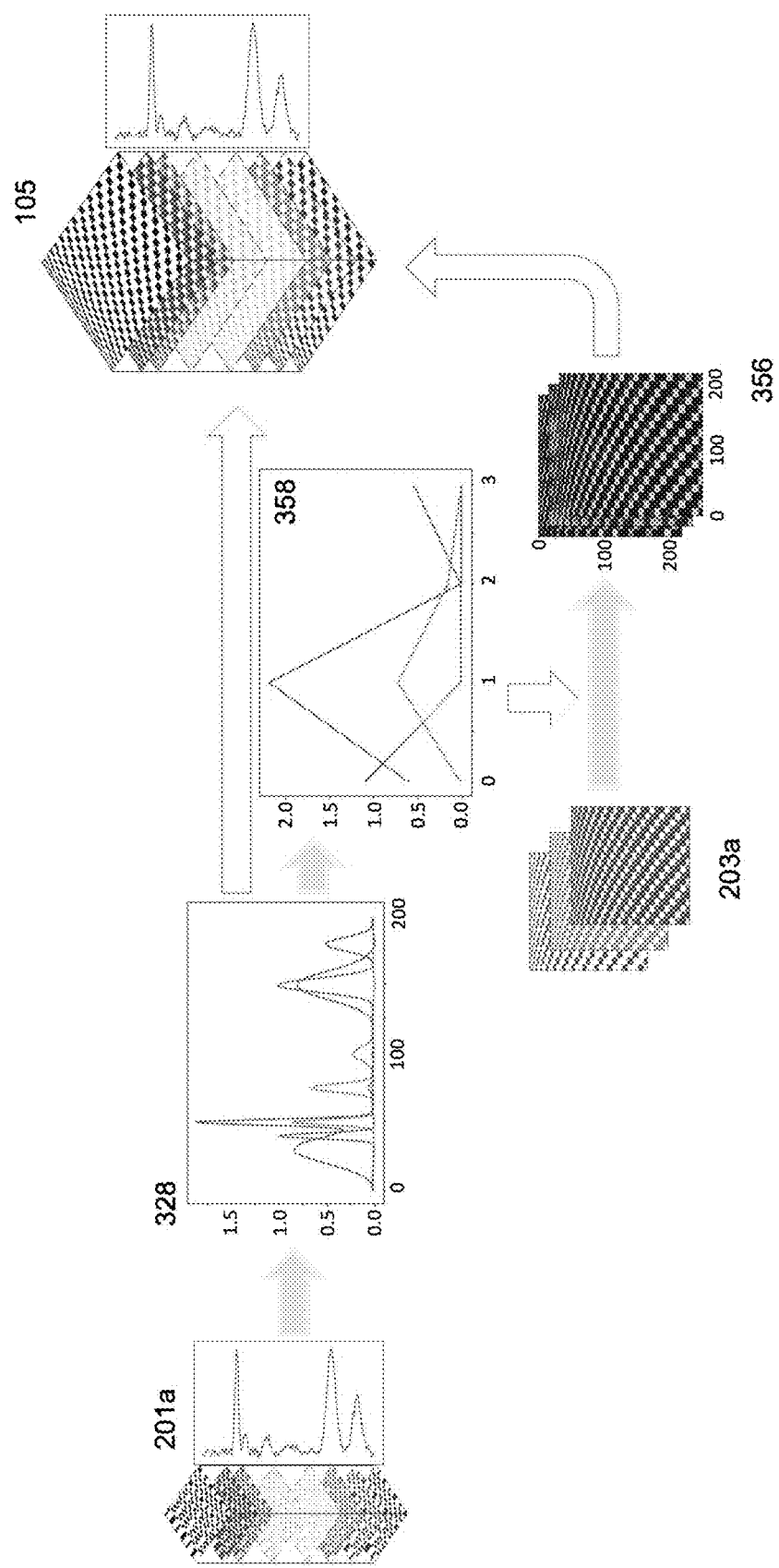
FIG. 8 illustrates an example the generation of the 3D spectral-data cube showing examples of full-spatial resolution, sparse spectral images, a full-spectral resolution, sparse spatial maps, endmember spectra and full-spatial abundance maps in accordance with aspects of the disclosure.

At 360, the full-spectral resolution spectra $\varepsilon_1(M_1), \ldots, \varepsilon_K(M_1)$ and the full-spatial resolution abundance maps are combined to determine a full-spatial resolution, full-spectral resolution data (3D spectral data cube 105). FIG. 8 shows an example of the combination of the full-spectral resolution spectra 328 and the full-spatial resolution abundance maps 356 to provide the 3D spectral-data cube 105.

3D spectral-data cube 105 can be expressed as matrix $Y_{M_1 \times N_2}$ that has $M_1$ rows and $N_2$ columns. Column j of matrix $Y_{M_1 \times N_2}$ corresponds to a respective full-spectral resolution spectrum $\sigma_j(M_1)$ associated with grid point j. Using the full-spectral resolution endmember matrix $H_{M_1 \times K}$ and the full-spatial resolution abundance map matrix $U_{K \times N_2}$, the full-spatial resolution, full-spectral resolution map matrix $Y_{M_1 \times N_2}$ can be determined as shown in EQ. (5).

$$Y_{M_1 \times N_2} = H_{M_1 \times K} U_{K \times N_2} \qquad (5).$$

Figure 4:
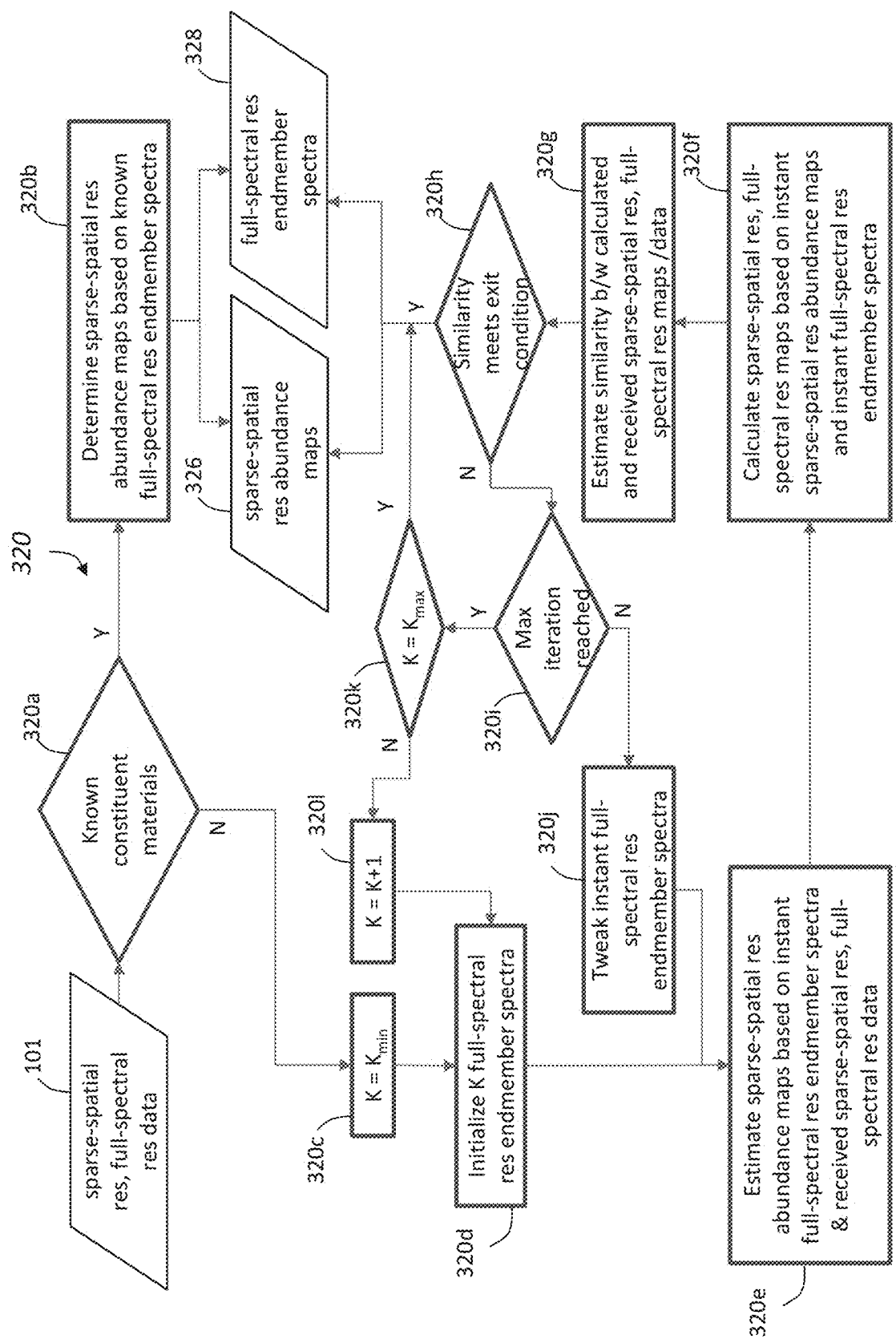
FIG. 4 illustrates a flow chart for a decomposition of the sparse-spatial resolution, full-spectral resolution data in accordance with aspects of the disclosure.

FIG. 4 is a flowchart of a decomposition of a full-spectral resolution, sparse-spectral resolution data 101 in accordance with aspects of the disclosure.

At 320a, the processor 150 determines whether constituent materials of a sample 290 measured by instrument 200 are known. For example, the sample 290 may have been previously analyzed using another spectroscopy technique. In other aspects, the constituent materials may be apriori known; however, the locations of the constituent materials within the sample 290 are unknown. If the materials are known, the processor 150 may retrieve the endmember spectra from a storage. For example, the processor 150 may retrieve the spectra from a server or from the Internet. In this case ("Y" at 320a), the full-spectral resolution endmember spectra (328) is obtained. The sparse-spectral resolution abundance maps (326) may be determined directly from the full-spectral resolution endmember spectra (328) (known) and the received sparse-spatial resolution, full-spectral data (301). Since the sparse-spatial resolution, full-spectral resolution data 101 is expressed as matrix $Y_{M_1 \times N_1}$, and the known full-spectral resolution endmember spectra 328 is expressed as matrix $H_{M_1 \times K}$, the sparse-spatial resolution abundance maps matrix $U_{K \times N_1}$ can be calculated by inverting EQ. (2) as shown in EQ. (6)

$$U_{K \times N_1} = H_{K \times M_1}^T Y_{M_1 \times N_1} \qquad (6).$$

When the constitute materials are not known ("N" at 320a), the processor 150 may initially set the number of endmembers K to a predetermined number K of endmembers at 320c. For example, the predetermined number may be set to 2. In other aspects, the processor 150 may initially guess the number of constituent materials, e.g., 2, 3, etc.

As described below, K can then be incremented, as necessary, when a determination is made that there may be more constitutive materials than the instant number K (based on a similarity condition).

At 320d, K full-spectral resolution endmember spectra $\varepsilon'_1(M_1), \ldots, \varepsilon'_K(M_1)$ is initialized. In some aspects, the initial full-spectral resolution endmember spectra are guessed randomly. In other aspects, the initial spectra may be based on the most common intensities for each spectral value. The full-spectral resolution endmember spectra initialized at 320d are represented by matrix $H'_{M_1 \times K}$.

At 320e, sparse-spatial resolution abundance maps are determined by estimating, at each grid point j, K coefficients $u'_{1,j}, \ldots, u'_{K,j}$ that best fit, based on EQ. 1, the instant K full-spectral resolution endmember spectra $\varepsilon'_1(M_1), \varepsilon'_K(M_1)$ to the full-spectral resolution spectrum $\sigma_j(M_1)$ associated with the grid point j, where j=1, . . . , $N_1$ is the sparse-spatial resolution grid index. The sparse-spatial resolution abundance maps estimated at 320e is represented by matrix $U'_{K \times N_1}$.

At 320f, a sparse-spatial resolution, full-spectral resolution map matrix is calculated based on the version of sparse-spatial resolution abundance maps associated with an instant iteration and a version of the full-spectral resolution endmember spectra associated with an instant iteration. Here, the version of the sparse-spatial resolution, full-spectral resolution map matrix associated with the instant iteration is represented as matrix $Y'_{M_1 \times N_1}$ and is calculated in accordance with EQ. (7)

$$Y'_{M_1 \times N_1} = H'_{M_1 \times K} U'_{K \times N_1} \qquad (7).$$

At 320g, the processor 150 determines a similarity between the calculated sparse-spatial resolution, full-spectral resolution map matrix and the received sparse-spatial resolution, full-spectral resolution data 101. In some aspects of the disclosure, the similarity is determined as a matrix difference as shown in EQ. (8)

$$\delta_{M_1 \times N_1} = Y'_{M_1 \times N_1} - Y_{M_1 \times N_1} \qquad (8).$$

At 320h, the processor 150 determines whether the estimated similarity meets an exit condition. In some aspects, the exit condition may be whether the difference is below a threshold, e.g., if a norm $\|\delta_{M_1 \times N_1}\|$ is below the threshold. In an aspect of the disclosure, the threshold may be user defined and based on processing power and desired time of acquisition. Usually, the threshold sets to be not more than 5-10% of the data norm.

When the exit condition is not satisfied ("N" at 320h), the processor 150 determines whether the number of iteration is less than a maximum number of iterations. The maximum number of iterations is to prevent an endless loop and may be a parameter defined based on computing resource availability and a specific study. For example, in some aspects, the maximum may be between 100 to 1000 number of iterations for limited computing resources. In other aspects of the disclosure, the maximum may be between $10^5$ and $10^6$ iterations for vast computing resources.

When the processor 150 determines that the maximum number of iterations has not been reached ("N" at S320i), the processor 150 changes the full-spectral resolution values for the endmember(s) at 320j. For example, the instant version(s) of the full-spectral resolution endmember spectra are changed to obtain new version(s) of the K full-spectral resolution endmember spectra $\varepsilon'_1(M_1), \ldots, \varepsilon'(M_1)$. In some aspects, the change can include making random changes to relative spectral positions, and/or relative intensities, of spectral features of the instant version of the full-spectral resolution endmember spectra.

In other aspects, the amount of change of the positions and/or relative intensities may be based on the difference in similarity where the larger the difference, the larger the change in positions and/or relative intensities.

320j, 320e, 320f and 320g may be repeated above described above, until the exit condition is satisfied ("Y" at 320h) (e.g., similar) or the number of iterations is at the maximum ("Y" at 320i).

When the maximum number of iterations is reached ("Y" at 320i) without reaching the exit condition, the processor 150 determines whether the instant number K of endmembers has reached a predetermined, maximum number of endmembers. The maximum number of endmembers may be based on a particular study or computing resource availability. In some aspects of the disclosure, there may be no maximum number of endmembers.

When the instant number K of endmembers is less than the maximum number ("N" at 320K), the processor 150 may increment the number of endmembers K by 1, K=K+1. In this manner, a new computation loop can be started in which a larger number (K+1) of full-spectral resolution endmember spectra $\varepsilon'_1(M_1), \ldots, \varepsilon'_{K+1}(M_1)$ is used to decompose the received sparse-spatial resolution, full-spectral resolution data 101.

320d, 320e, 320f, 320g, 320h and 320i are repeated. In other aspects of the disclosure, the number of endmembers may be incremented by more than one based on the difference in similarity. For example, when there is a larger dissimilarity, the number of endmembers may be increased by more than one.

If after 320h, the exit condition is still not satisfied, 320i is repeated. A new computation loop may be further implemented (K+n) to determine the abundance maps.

On the other hand, when the exit condition is not satisfied ("N" 320h) and the maximum iterations is reached ("Y" 320i) and maximum endmembers ("Y" at 320k), the current version of the abundances maps and the endmember spectra is output as the sparse-spatial resolution abundance maps 326 represented by matrix $U_{K \times N_1}$, and the full-spectral resolution endmember spectra represented by matrix $H_{M_1 \times K}$.

Also, when the exit condition is satisfied ("Y" at 320h), the current version of the abundance maps and the endmember spectra is output as the sparse-spatial resolution abundance maps 326 represented by matrix $U_{K \times N_1}$, and the full-spectral resolution endmember spectra represented by matrix $H_{M_1 \times K}$. FIG. 8 illustrates an example of the full-spectral resolution endmember spectra 328.

Figure 5:
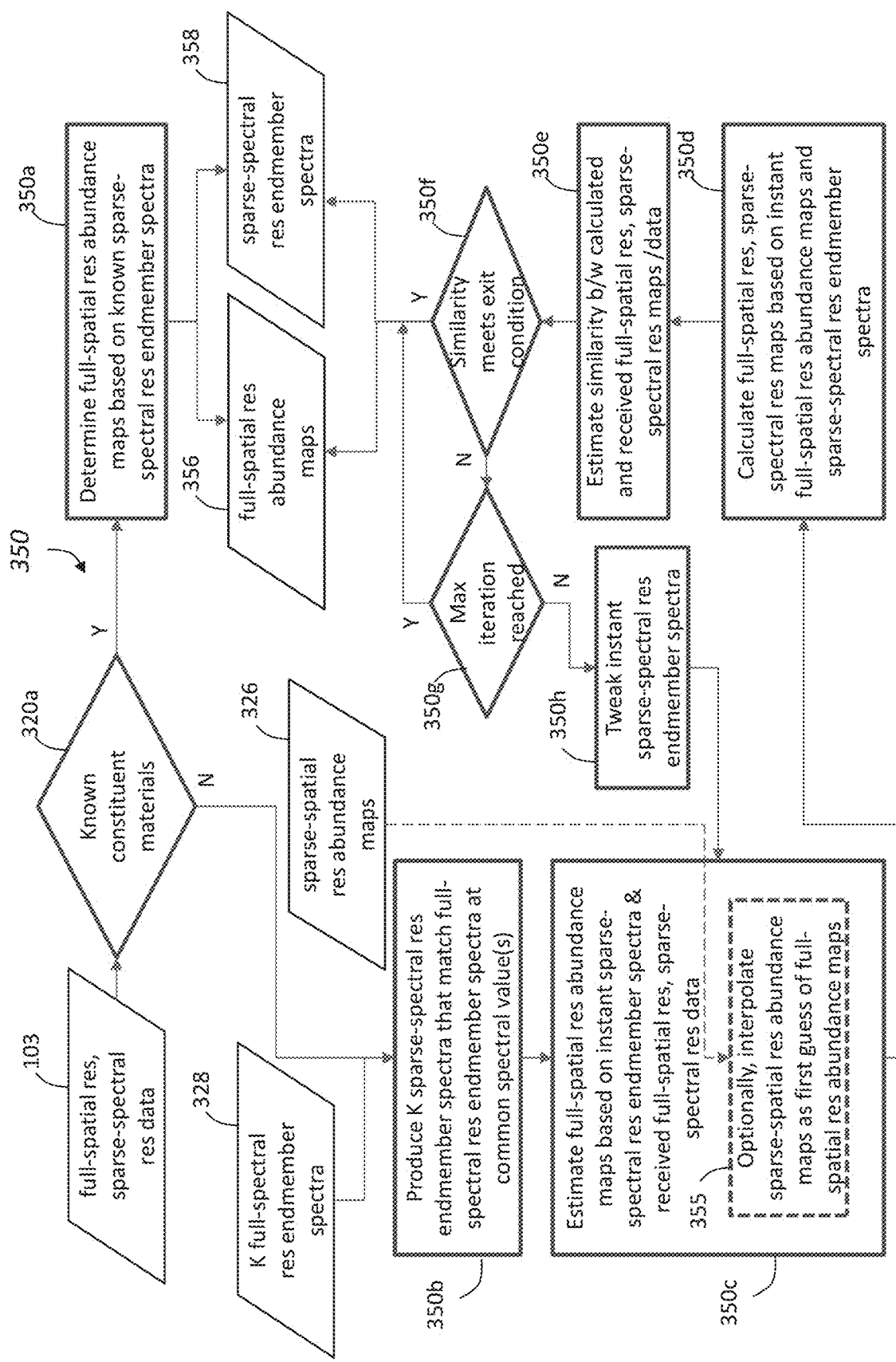
FIG. 5 illustrates a flow chart for a decomposition of the full-spatial resolution, sparse-spectral resolution data in accordance with aspects of the disclosure.

FIG. 5 illustrates a flow chart for a decomposition of the full-spatial resolution, sparse-spectral resolution data 103 in accordance with aspects of the disclosure.

Similar to above, at 320a, the processor 150 determines whether constituent materials of a sample measured by instrument 200 are known. When they are known ("Y" at 320a), the full-spatial resolution abundance maps 356 are determined based on the known sparse-spectral resolution endmember spectra 358 and the received full-spatial resolution, sparse-spectral resolution data 103. Since the full-spatial resolution, sparse-spectral resolution data 103 is expressed as matrix $Y_{M_2 \times N_2}$, and the known sparse-spectral resolution endmember spectra can be expressed as matrix $H_{M_2 \times K}$, the full-spatial resolution abundance map matrix $U_{K \times N_2}$ can be calculated by inverting EQ. (4) as shown in EQ. (9)

$$U_{K \times N_2} = H_{K \times M_2}^T Y_{M_2 \times N_2} \qquad (9).$$

When the constituent materials are not known, the processor 150 at 350b, may generate a first instance of K sparse-spectral resolution endmember spectra $e'_1(M_2), \ldots, e'_K(M_2)$ from the full-spectral resolution endmember spectra 328. As noted above, there is a one-to-one correspondence between the sparse- and full-spectral resolution spectra of the endmembers, such that the sparse-spectral resolution spectrum $e_i(M_2)$ may be a down-sampled copy of the full-spectral resolution spectrum $E_1(M_1)$. Hence, the sparse-spectral resolution endmember spectra $e'_1(M_2), \ldots, e'_K(M_2)$ may be initially generated to match the full-spectral resolution endmember spectra $\varepsilon_1(M_1), \ldots, \varepsilon_K(M_1)$ at common spectral values.

At 350c, full-spatial resolution abundance maps are determined by estimating, at each grid point j, K coefficients $w'_{1,j}, \ldots w'_{K,j}$ that best fit, based on EQ. 3, the K sparse-spectral resolution endmember spectra $e'_1(M_2), \ldots, e'_K(M_2)$ to the sparse-spectral resolution spectrum $s_j(M_2)$ associated with the grid point j, where j=1, ..., $N_2$ is the full-spatial resolution grid index.

In an aspect of the disclosure, the processor 150 interpolates the sparse-spatial resolution abundance maps 326 to produce, a first guess of the full-spatial resolution abundance maps 356 (at 355). The interpolation can be implemented as a bilinear interpolation, for instance, because the sparse-spatial resolution grid points j are part of a two-dimensional spatial array. The interpolation is not limited to bilinear interpolation and other interpolations may be used.

In other aspects of the disclosure, the processor 150 may use random values for the initial guess of the full-spatial resolution abundance maps (without interpolation). The full-spatial resolution abundance maps estimated at 350c is represented by matrix $U'_{K \times N_2}$.

At 350d, the processor 150 calculates full-spatial resolution, sparse-spectral resolution maps based on the version of the full-spatial resolution abundance maps associated with the instant iteration and the sparse-spectral resolution endmember spectra also for the instant iteration. Here, the version of the full-spatial resolution, sparse-spectral resolution maps associated with the instant iteration is represented as matrix $Y'_{M_2 \times N_2}$ and is calculated in accordance with EQ. (10)

$$Y'_{M_2 \times N_2} = H'_{M_2 \times K} U'_{K \times N_2} \qquad (10).$$

At 350e, the processor 150 determines the similarity between the calculated full-spatial resolution, sparse-spectral resolution maps and the received full-spatial resolution, sparse-spectral resolution data 103. In some aspects of the disclosure, the similarity is estimated as a matrix difference as shown in EQ. (11)

$$\delta_{M_2 \times N_2} = Y'_{M_2 \times N_2} - Y_{M_2 \times N_2} \qquad (11).$$

At 350f, the processor 150 determines whether the estimated similarity meets an exit condition. In some aspects of the disclosure, the exit condition is if a norm $\|\delta_{M_2 \times N_2}\|$ of the difference is below a threshold. In an aspect of the disclosure, the threshold may be user defined and based on processing power and desired time of acquisition. Usually, the threshold sets to be not more than 5-10% of the data norm.

When the exit condition is not satisfied ("N" at 350f), the processor 150 may determine whether the number of iterations is less than a maximum number of iterations at 350g. The maximum number of iterations is to prevent an endless loop and can be a parameter defined based on computing resource availability and a specific study. For example, in some aspects, the maximum may be between 100 to 1000 number of iterations for limited computing resources. In other aspects of the disclosure, the maximum may be between $10^5$ and $10^6$ iterations for vast computing resources.

When the processor 150 determines that the maximum number of iterations has not been reached ("N" at S350g), the processor 150 changes the sparse-spectral resolution values for the endmember(s) at 350h. For example, the instant version(s) of the sparse-spectral resolution endmember spectra are changes to obtain new version(s) of the K sparse-spectral resolution endmember spectra $e'_1(M_2), \ldots, e'_K(M_2)$. In some aspects, the change can include making random changes to relative spectral positions, and/or relative intensities, of spectral features of the instant version of the sparse-spectral resolution endmember spectra. Similar to above, the magnitude of the change may be proportional to the magnitude of the difference.

350h, 350c, 350d, 350e continue until the exit condition is satisfied ("Y" at 350f) (e.g., similar) or the number of iterations is at the maximum ("Y" at 350g).

Also, when the exit condition is satisfied ("Y" at 350, the current version of the abundance maps and the endmember spectra is output as the full-spatial resolution abundance map 356 represented by matrix $U_{K \times N_2}$, and the sparse-spectral resolution endmember spectra represented by matrix $H_{M_1 \times K}$. FIG. 8 illustrates an example of the full-spatial resolution abundance maps 356 and sparse-spectral resolution endmember spectra 358.

In some aspects of the disclosure, when the exit condition is not satisfied ("N" 350f) and the maximum iterations is reached ("Y" 350g), the current version of the abundance maps and the endmember spectra may be output as the full-spatial resolution abundance maps 356 represented by matrix $U_{K \times N_2}$, and the sparse-spectral resolution endmember spectra 358 represented by matrix $H_{M_1 \times K}$.

In other aspects of the disclosure, when the exit condition is not satisfied ("N" 350f) and the maximum iterations is reached ("Y" 350g), the processor 150 may instruct the instrument 200 to acquire additional full-spatial resolution, sparse-spectral resolution data. The spectral value for the image may correspond to another peak in the end member spectrum.

In other aspects of the disclosure, the full-spatial resolution, sparse-spectral resolution data 103 may be acquired first.

For example, in some aspects of the disclosure, a predetermined number of full-spatial resolution, sparse-spectral resolution images (such as 203a) may be acquired. The images 203a may be set to be equidistance within the spectrum to represent the entire spectrum. In other aspects, the spectral values for the images 203a may be randomly determined. In other aspects, the spectral values for the full-spatial resolution, sparse-spectral resolution images 203a may be set based on a guess of the constituent materials in the sample.

In this aspect of the disclosure, the maximum number of iterations may be reduced and when the similarity between the received full-spatial resolution, sparse-spectral resolution images 203a and the calculated full-spatial resolution, sparse-spectral map in 350d is not similar, the processor 150 may instruct the instrument 200 to acquire one or more other full-spatial resolution, sparse-spectral resolution images 203a. The spectral values within the given spectrum for these other full-spatial resolution, sparse-spectral resolution images 203a may be based on the peaks in the end member spectra 328.

As described above, the 3D spectral-data cube 105 is determined using CNMF. CNMF has a relatively low computational cost and high quality of the factorization product. Additionally, the analysis in the CNMF uses the entire spectral range for calculating an abundance map, which is particularly important for certain studies. For example, for certain imaging techniques, a goal is to pinpoint the spatial location of individual species within distinct spectral signatures rather than investigation of isolated bands.

However, in other aspects of the disclosure, other methods for determining the 3D spectral-data cube 105 from the sparse-spatial resolution, full-spectral resolution data 101 and the full-spatial resolution, sparse-spectral data 103 may be used. For example, the methods may include component substitution (CS), multi-resolution analysis (MRA), Bayesian methods and neural networks.

Figure 6:
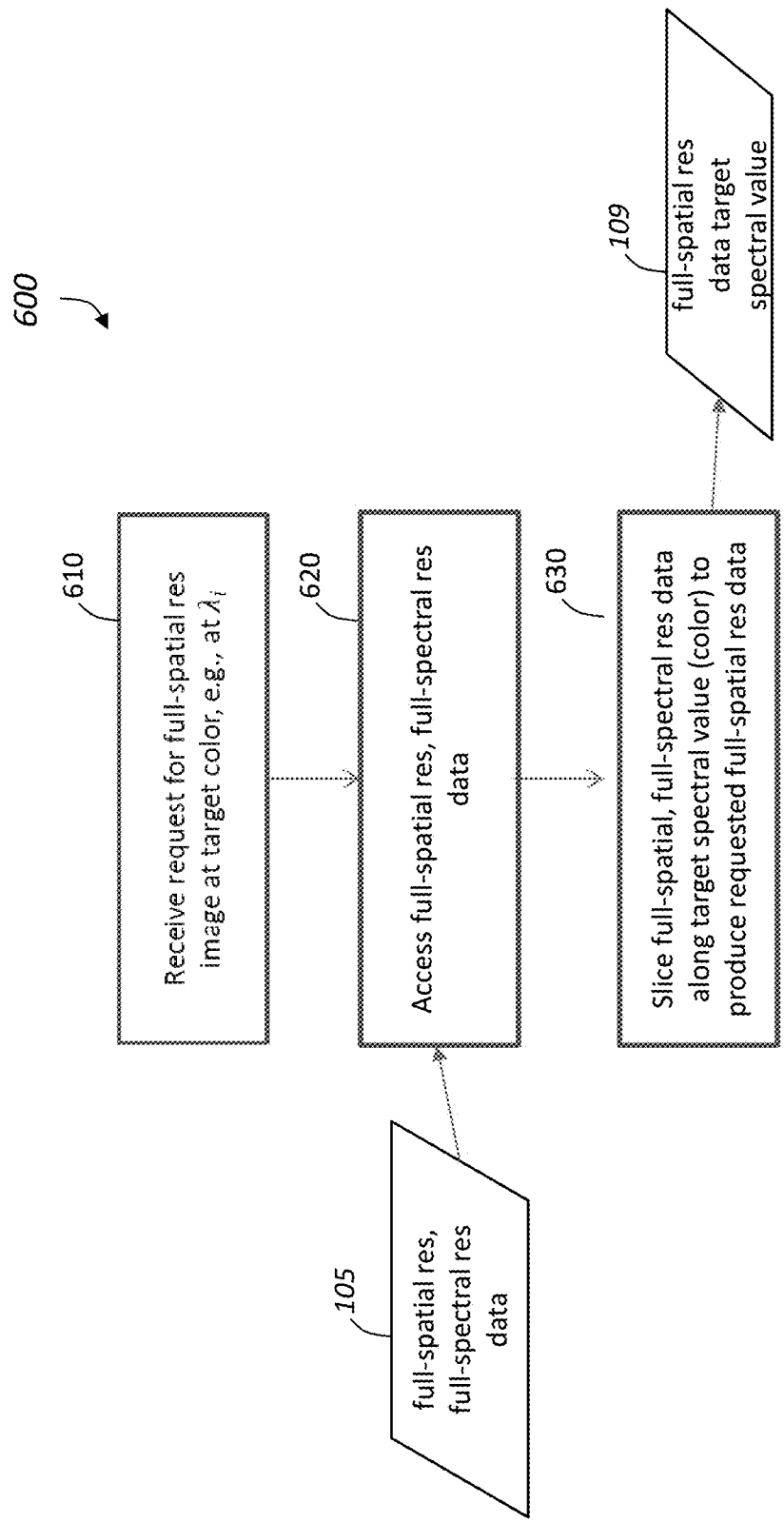
FIG. 6 illustrates a flowchart for providing information related to any full-spatial resolution, full-spectral resolution image in accordance with aspects of the disclosure.

FIG. 6 is a flowchart showing a process 600 for providing information related to any full-spatial resolution, full-spectral resolution image in accordance with aspects of the disclosure.

As described above, the process may be executed by the processor 150, a processor in an instrument 250 or a server 154. At 610, a processor receives a request via a user interface for information related to a full-spatial resolution, full-spectral resolution image for a target spectral value. In some aspects of the disclosure, the image will be a monochromatic image for the target color. At 620, the processor may retrieve the 3D spectral-data cube which was determined at 360 based on 356 and 328. In an aspect of the disclosure, a local processor may transmit a request for the 3D spectral-data cube 105 to server 154. In other aspects, the processor may have the 3D spectral-data cube 105 stored locally.

At 630, the processor slices the 3D spectral-data cube 105 based on the requested target spectral value to obtain a full-spatial resolution, full-spectral resolution image for the target spectral value (e.g., target color). In some aspects of the disclosure, the processor causes the display of the full-spatial resolution, full-spectral resolution image on the display 130. In other aspects, the processor analyzes the image data 109 and presents information corresponding to the image instead of or in addition to the image. For example, the processor may display a pixel(s) and/or intensity value corresponding to the maximum intensity for the target spectral value, pixel(s) and/or intensity value corresponding to the minimum intensity for the target spectral values, pixels having a highest degree of change in intensity values to adjacent pixels. Additionally, the processor can calculate spatial maps of the properties corresponding to certain spectral peaks (e.g. peak position, mass center, FWHM) or integral properties of the full spectra (e.g. total intensity).

Provisional application Ser. No. 63/010,967 describes and illustrates several examples of the application of the above-described techniques to an ARM-IR. This description is incorporated by reference herein.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electro-magnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The terminology used herein is for the purpose of describing particular aspects only and is not intended to be limiting the scope of the disclosure and is not intended to be exhaustive. Many modifications and variations will be apparent to those of ordinary skill in the art without departing from the scope and spirit of the disclosure.

What is claimed is:

1. A system comprising:
   an instrument configured to:
   acquire a set of two or more first-spatial resolution monochromatic images corresponding to slices of a 3D spectral-data cube, the 3D spectral-data cube has two spatial dimensions and one spectral dimension, the two spatial dimensions having the first-spatial resolution, each point in the two spatial dimensions has an associated spectrum extending over a given spectral range, the 3D spectral-data cube is indicative of one or more constitutive materials of a sample and their abundance on the sample's surface,
   for each first-spatial resolution monochromatic image, each first-spatial resolution point has an associated spectral value at a respective color within the given spectral range, where a number of images in the set is less than a number of slices of the 3D spectral-data cube; and
   acquire second-spatial resolution spectral maps of the sample, the second-spatial resolution being less than the first-spatial resolution, each second-spatial resolution point of the second-spatial resolution spectral maps has an associated spectrum extending over the given spectral range, and
   a processor configured to:
   receive the set of two or more first-spatial resolution monochromatic images and the second-spatial resolution spectral maps of the sample;
   produce the 3D spectral-data cube by combining the two or more first-spatial resolution monochromatic images and the second-spatial resolution spectral maps using a particular restoration procedure;
   generate a first-spatial resolution monochromatic image for a target spectral value within the given spectral range using the 3D spectral-data cube in response to receipt of a request for the target spectral value, the target spectral value being any spectral value within the given spectral range; and
   cause a presentation of information about the first-spatial resolution monochromatic image for the target spectral value on a display.

2. The system of claim 1, wherein the processor is further configured to analyze the second-spatial resolution spectral maps of the sample to determine spectra of the one or more constitutive materials of the sample and a number of the one or more materials and configured to control the instrument to acquire the set of two or more first-spatial resolution monochromatic images based on the determinations.

3. The system of claim 2, wherein a number of first-spatial resolution monochromatic images in the set is greater than or equal to the determined number of the one or more materials.

4. The system of claim 2, wherein the respective color of each first-spatial resolution monochromatic image acquired is within the spectra of different peaks in the determined spectra.

5. The system of claim 1, wherein the instrument is configured for atomic force microscope (AFM) in IR mode (AFM-IR) and wherein the instrument comprises a tunable-pulsed light source, a cantilever, a deflection light source configured to emit light onto the cantilever and a light detector configured to detect light which corresponds to light absorbed by the sample, where the spectral dimension of the 3D spectral-data cube is wavenumbers within a given IR spectral range.

6. The system of claim 5, wherein the first-spatial resolution is the same spatial resolution as the AFM.

7. The system of claim 1, wherein the instrument comprises the processor.

8. The system of claim 1, wherein the spectral dimension of the 3D spectral-data cube is continuous within the given spectral range.

9. The system of claim 1, wherein the particular restoration procedure is coupled non-negative matrix factorization (CNMF).

10. The system of claim 9, wherein the CNMF comprises a first decomposition and a second composition,
in the first decomposition, the processor is configured to determine a number of endmembers in the second-spatial resolution spectral maps, spectra for each endmember and coefficients for each spatial point in the second-spatial resolution for each endmember, where the coefficients form first abundance maps, and the spectra of the endmembers form first spectral maps; and
in the second decomposition, the processor is configured to determine the spectra for the same endmember in the first-spatial resolution monochromatic images, and coefficients for each spatial point in the first-spatial resolution monochromatic images, where the spectra for the same endmembers form second spectral maps, and the coefficients for the same endmembers for each spatial point in the first-spatial resolution monochromatic images form second abundance maps; and
wherein the processor is further configured to produce the 3D spectral-data cube by multiplying the first spectral maps by the second abundance maps.

11. The system of claim 10, wherein the spectra for the endmembers represents the spectra of the one or more constitutive materials in the sample, respectively.

12. The system of claim 10, wherein the number of endmembers is based on a number of distinctly dissimilar spectral signatures within the second-spatial resolution spectral maps.

13. The system of claim 10, wherein the determination of the coefficients for the same endmembers for each spatial point in the first-spatial resolution monochromatic images is an iterative process and initial values are determined by interpolation of the coefficients in the first abundance maps.

14. The system of claim 13, wherein the interpolation is bilinear interpolation.

15. The system of claim 10, wherein the determination of the spectra for the same endmembers in the first-spatial resolution monochromatic images is an iterative process and initial values are based on spectral values in the first spectral maps corresponding to the respective color of each first-spatial resolution monochromatic image.

16. The system of claim 1, wherein the information about the first-spatial resolution monochromatic image is the first-spatial resolution monochromatic image.

17. An apparatus comprising:
a communication interface;
a user interface configured to receive requests for a target spectral value within a given spectral range;
a memory configured to store one or more computer readable modules;
a processor, when executing the one or more computer readable modules is configured to:
receive a set of two or more first-spatial resolution monochromatic images corresponding to slices of a 3D spectral-data cube from an instrument via the communication interface, the 3D spectral-data cube has two spatial dimensions and one spectral dimension, the two spatial dimensions having the first-spatial resolution, each point in the two spatial dimensions has an associated spectrum extending over the given spectral range, the 3D spectral-data cube is indicative of one or more constitutive materials of a sample and their abundance on the sample's surface,
for each first-spatial resolution monochromatic image, each first-spatial resolution point has an associated spectral value at a respective color within the given spectral range, where a number of images in the set is less than a number of slices of the 3D spectral-data cube;
receive second-spatial resolution spectral maps of the sample from an instrument via the communication interface, the second-spatial resolution being less than the first-spatial resolution, each second-spatial resolution point of the second-spatial resolution spectral maps has an associated spectrum extending over the given spectral range;
produce the 3D spectral-data cube by combining the two or more first-spatial resolution monochromatic images and the second-spatial resolution spectral maps using a particular restoration procedure and store the 3d-spectral data cube in the memory;
generate a first-spatial resolution monochromatic image for a target spectral value within the given spectral range using the stored 3D spectral-data cube in response to receipt of a request for the target spectral value via the user interface, the target spectral value being any spectral value within the given spectral range; and
cause a presentation of information about the first-spatial resolution monochromatic image for the target spectral value on a display.

18. A method comprising:
receiving a set of two or more first-spatial resolution monochromatic images corresponding to slices of a 3D spectral-data cube from an instrument, the 3D spectral-data cube has two spatial dimensions and one spectral dimension, the two spatial dimensions having the first-spatial resolution, each point in the two spatial dimensions has an associated spectrum extending over the given spectral range, the 3D spectral-data cube is indicative of one or more constitutive materials of a sample and their abundance on the sample's surface,
for each first-spatial resolution monochromatic image, each first-spatial resolution point has an associated spectral value at a respective color within the given spectral range, where a number of images in the set is less than a number of slices of the 3D spectral-data cube;

receive second-spatial resolution spectral maps of the sample from an instrument via the communication interface, the second-spatial resolution being less than the first-spatial resolution, each second-spatial resolution point of the second-spatial resolution spectral maps has an associated spectrum extending over the given spectral range;

producing the 3D spectral-data cube by combining the two or more first-spatial resolution monochromatic images and the second-spatial resolution spectral maps using a particular restoration procedure and storing the 3D spectral-data cube;

generating a first-spatial resolution monochromatic image for a target spectral value within the given spectral range using the stored 3D spectral-data cube in response to receipt of a request for the target spectral value, the target spectral value being any spectral value within the given spectral range; and causing a presentation of information about the first-spatial resolution monochromatic image for the target spectral value.

19. The method of claim 18, wherein combining the second-spatial resolution spectral maps with the first-spatial resolution monochromatic images comprises:

decomposing the second-spatial resolution spectral maps to obtain a first matrix representing spectra of the one or more constitutive materials of the sample; and decomposing the set of first-spatial resolution monochromatic images to obtain a second matrix representing abundance maps of the one or more constitutive materials on the sample's surface; and wherein the 3D spectral-data cube is produced by multiplying the first matrix and the second matrix.

20. The method of claim 18, further comprising:

analyzing the second-spatial resolution spectral maps of the sample to determine spectra of the one or more constitutive materials of the sample and determine a number of the one or more constitutive materials therein; and controlling the instrument to acquire the set of two or more first-spatial resolution monochromatic images based on the determinations.

21. A computer-readable recording medium having one or more modules of computer-readable instructions, the computer-readable instructions, when executed by a processor cause the processor to:

receive a set of two or more first-spatial resolution monochromatic images corresponding to slices of a 3D spectral-data cube from an instrument, the 3D spectral-data cube has two spatial dimensions and one spectral dimension, the two spatial dimensions having the first-spatial resolution, each point in the two spatial dimensions has an associated spectrum extending over the given spectral range, the 3D spectral-data cube is indicative of one or more constitutive materials of a sample and their abundance on the sample's surface, for each first-spatial resolution monochromatic image, each first-spatial resolution point has an associated spectral value at a respective color within the given spectral range, where a number of images in the set is less than a number of slices of the 3D spectral-data cube;

receive second-spatial resolution spectral maps of the sample from an instrument, the second-spatial resolution being less than the first-spatial resolution, each second-spatial resolution point of the second-spatial resolution spectral maps has an associated spectrum extending over the given spectral range;

produce the 3D spectral-data cube by combining the two or more first-spatial resolution monochromatic images and the second-spatial resolution spectral maps using a particular restoration procedure and store the 3D spectral-data cube;

generate a first-spatial resolution monochromatic image for a target spectral value within the given spectral range using the stored 3D spectral-data cube in response to receipt of a request for the target spectral value, the target spectral value being any spectral value within the given spectral range; and cause a presentation of information about the first-spatial resolution monochromatic image for the target spectral value.

22. A method comprising:

receiving a set of two or more first-spatial resolution monochromatic images corresponding to slices of a 3D spectral-data cube from an instrument, the 3D spectral-data cube has two spatial dimensions and one spectral dimension, the two spatial dimensions having the first-spatial resolution, each point in the two spatial dimensions has an associated spectrum extending over the given spectral range, the 3D spectral-data cube is indicative of one or more constitutive materials of a sample and their abundance on the sample's surface, for each first-spatial resolution monochromatic image, each first-spatial resolution point has an associated spectral value at a respective color within the given spectral range, where a number of images in the set is less than a number of slices of the 3D spectral-data cube;

receiving second-spatial resolution spectral maps of the sample from an instrument, the second-spatial resolution being less than the first-spatial resolution, each second-spatial resolution point of the second-spatial resolution spectral map has an associated spectrum extending over the given spectral range;

producing the 3D spectral-data cube by combining the two or more first-spatial resolution monochromatic images and the second-spatial resolution spectral maps using a particular restoration procedure and storing the 3D spectral-data cube; and transmitting the 3D spectral-data cube to a server.

23. A system comprising:

an instrument configured to:

acquire first-spatial resolution first-spectral resolution maps corresponding to a subset of slices of a 3D spectral-data cube, the 3D spectral-data cube has two spatial dimensions and one spectral dimension, the two spatial dimensions having the first-spatial resolution, each point in the two spatial dimensions has an associated spectrum extending over a given spectral range, the 3D spectral-data cube is indicative of one or more constitutive materials of a sample and their abundance on the sample's surface, each first-spatial resolution point has an associated spectrum extending over the given spectral range; and acquire second-spatial resolution second spectral resolution maps of the sample, the second-spatial resolution being less than the first-spatial resolution, the second-spectral resolution being more than the first-spectral resolution, each second-spatial resolution point has an associated spectrum extending over the given spectral range, and a processor configured to:
  receive the first-spatial resolution first-spectral resolution maps and the second-spatial resolution second spectral resolution maps of the sample; and
  produce the 3D spectral-data cube by combining the first-spatial resolution first-spectral resolution maps and the second-spatial resolution second spectral resolution maps using a particular restoration procedure.

24. The system of claim 23, wherein the processor is further configured to:
  generate a first-spatial resolution image for a target spectral value within the given spectral range using the 3D spectral-data cube in response to receipt of a request for the target spectral value, the target spectral value being any spectral value within the given spectral range; and
  cause a presentation of information about the first-spatial resolution image for the target spectral value on a display.

25. The system of claim 23, wherein the processor is further configured to transmit the 3D spectral-data cube to a server.

26. The system of claim 23, wherein the instrument is configured for time-of-flight secondary ion mass spectrometry (ToF-SIMS), wherein the instrument comprises:
  a first ion beam and a second ion beam, where the second ion beam is focused and has a spot size smaller than the first ion beam;
  an electrode configured to extract ions from the sample; and
  an a time-of flight analyzer configured to detect ions and a time each ions reach the detector, wherein the spectral dimension of the 3D spectral-data cube is a mass spectrum or a mass-to-charge ratio spectrum.

27. The system of claim 23, wherein the instrument is configured for Electron Energy Loss Spectrometry, wherein the instrument comprises an electron beam and an electron energy loss spectrometer, wherein the spectral dimension of the 3D spectral-data cube is an energy loss spectrum.

* * * * *